United States Patent
Ran et al.

(10) Patent No.: US 12,531,594 B2
(45) Date of Patent: Jan. 20, 2026

(54) RECEIVER PERFORMANCE MEASUREMENT SYSTEM AND METHOD THEREOF

(71) Applicant: Cisco Technology, Inc., San Jose, CA (US)

(72) Inventors: Adee Ran, Maayan Baruch (IL); Upen Reddy Kareti, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/539,172

(22) Filed: Dec. 13, 2023

(65) Prior Publication Data
US 2025/0112667 A1    Apr. 3, 2025

Related U.S. Application Data

(60) Provisional application No. 63/508,581, filed on Jun. 16, 2023.

(51) Int. Cl.
| | |
|---|---|
| *H04B 3/46* | (2015.01) |
| *H04L 1/00* | (2006.01) |
| *H04L 1/20* | (2006.01) |
| *H04L 1/24* | (2006.01) |

(52) U.S. Cl.
CPC ............. *H04B 3/46* (2013.01); *H04L 1/0045* (2013.01); *H04L 1/203* (2013.01); *H04L 1/241* (2013.01)

(58) Field of Classification Search
CPC ......... H04B 3/46; H04L 1/0045; H04L 1/203; H04L 1/244; H04L 1/241
See application file for complete search history.

(56) References Cited

U.S. PATENT DOCUMENTS

| | | | |
|---|---|---|---|
| 9,083,576 B1 | 7/2015 | Hormati | |
| 11,005,598 B1 | 5/2021 | Jones | |
| 12,034,620 B2 * | 7/2024 | Mahadevan | ....... H03M 13/1102 |
| 2014/0157067 A1 | 6/2014 | Yang | |
| 2015/0106668 A1 | 4/2015 | Ran | |

(Continued)

OTHER PUBLICATIONS

M. Wu, X. Hu, R. Zhang and L. Yang, "Collision Recognition in Multihop IEEE 802.15.4—Compliant Wireless Sensor Networks," in IEEE Internet of Things Journal, vol. 6, No. 5, pp. 8542-8552, Oct. 2019, (Year: 2019).*

(Continued)

*Primary Examiner* — Cynthia Britt
(74) *Attorney, Agent, or Firm* — Rutan & Tucker, LLP; Ravi Mohan; Marc McClain

(57) ABSTRACT

Devices, networks, systems, methods, and processes for determining receiver performance metric of a network device are described herein. A device may utilize one or more error patterns associated with the network device to retrieve one or more symbol errors from the one or more error patterns. The device can determine an error threshold for a segment based on a predefined Bit Error Rate (BER) level for the segment. The device may generate a performance metric for the segment based on the error threshold and the retrieved symbol errors. The device can generate a receiver performance metric based on performance metrics of segments. The device may determine a Code Error Ratio (CER) and can predict a Frame Loss ratio (FLR) associated with the network device based on the CER.

20 Claims, 13 Drawing Sheets

(56) References Cited

U.S. PATENT DOCUMENTS

| | | |
|---|---|---|
| 2015/0318919 A1 | 11/2015 | Dawe |
| 2020/0204307 A1 | 6/2020 | Calabró |
| 2020/0321978 A1 | 10/2020 | Ran et al. |
| 2022/0231771 A1* | 7/2022 | Sugiyama ............ H04B 17/309 |
| 2022/0337359 A1 | 10/2022 | Iwai |
| 2024/0214134 A1* | 6/2024 | Aziz ................... H04L 41/0823 |

OTHER PUBLICATIONS

Partial European Search Report for European Application No. 24180932.6, dated Oct. 31, 2024, 13 Pages.

* cited by examiner

RECEIVER PERFORMANCE MEASUREMENT SYSTEM AND METHOD THEREOF

This application is being filed on Dec. 13, 2023, as a Non-Provisional patent application and claims the benefit of and priority to U.S. Provisional patent application Ser. No. 63/508,581, filed Jun. 16, 2023, the disclosure of which is incorporated by reference herein in its entirety.

TECHNICAL FIELD

The present disclosure relates to digital networks. More particularly, the present disclosure relates to measuring performances of devices in a digital network.

BACKGROUND

Digital networks play a crucial role in facilitating data transmission between devices in today's interconnected world. Errors in the data transmission are not uncommon in the digital networks, and they can result from various factors. These errors can have a significant impact on integrity and reliability of the digital networks. Various metrics are used to measure the errors in the digital networks, for example, metrics such as Bit Error Rate (BER) and Frame Loss Ratio (FLR) are commonly used. BER is more suitable for evaluating performance of individual components of the devices whereas FLR is more suitable for evaluating end-to-end performance between the devices.

BER is commonly evaluated using standard test patterns like Pseudo-Random Bit Sequences (PRBS). PRBS patterns are generated in both: transmitters and receivers. A receiver compares received data with a PRBS pattern generated using an internal PRBS generator in the receiver, to determine the errors in the received data. A ratio of the errors to total bits received provides an estimate of BER. In contrast, packet-based communication systems such as Ethernet operate differently. In these systems, a packet (or a frame) is either received correctly or not. Ethernet utilizes CRC32 error detection, and any frame received with even a single error fails CRC check and is discarded. Exact number of bit errors within a discarded frame is inconsequential and remains unknown to the receiver. Consequently, BER cannot be determined from a data stream of frames or packets. As a result, modern Ethernet Physical Layer devices (PHYs) utilize FLR, which is better suited for these scenarios.

SUMMARY OF THE DISCLOSURE

Systems and methods for protecting software agents from various services while operating within a workload protection solution in accordance with embodiments of the disclosure are described herein. In some embodiments, a device, includes a processor, a memory communicatively coupled to the processor, and a receiver performance measurement logic. The logic is configured to store a plurality of error patterns wherein each error pattern includes a plurality of symbol errors, retrieve one or more symbol errors, access one or more segments associated with a network device, determine an error threshold for at least one segment, and generate a performance metric based on the one or more symbol errors and the error threshold.

In some embodiments, the plurality of error patterns are stored in a plurality of error bin registers.

In some embodiments, the plurality of error bin registers are located within the network device.

In some embodiments, the error threshold is based on a predefined bit error rate (BER) level.

In some embodiments, the plurality of error patterns include a count of the one or more symbol errors within one or more Forward Error Correction (FEC) codewords.

In some embodiments, the receiver performance measurement logic is further configured to determine a count of the one or more FEC codewords having a count of the one or more symbol errors equal to the error threshold, determine a probability of occurrence of the one or more FEC codewords having the count of the one or more symbol errors not less than the error threshold based on the plurality of error patterns and the count of the one or more FEC codewords having the count of the one or more symbol errors equal to the error threshold, and generate the performance metric based on the probability of the occurrence of the one or more FEC codewords having the count of the one or more symbol errors not less than the error threshold.

In some embodiments, the receiver performance measurement logic is further configured to generate one or more performance metrics associated with the one or more segments coupled to the network device, and generate a receiver performance metric associated with the network device based on the one or more performance metrics associated with the one or more segments.

In some embodiments, the network device operates in a Physical Coding Sublayer (PCS).

In some embodiments, the receiver performance measurement logic is further configured to generate a predefined test pattern, apply the predefined test pattern to the network device, and receive a plurality of output blocks from the network device in response to the predefined test pattern.

In some embodiments, the receiver performance measurement logic is further configured to determine a count of the one or more symbol errors in an output block of the plurality of output blocks, increment a codeword counter, compare the count of the one or more symbol errors in the output block with the error threshold, and increment an error counter if the count of the one or more symbol errors in the output block is greater than the error threshold.

In some embodiments, the receiver performance measurement logic is further configured to determine a probability of occurrence of one or more output blocks having the count of the one or more symbol errors greater than the error threshold, and generate the performance metric based on the probability of the occurrence of the one or more output blocks having the count of the one or more symbol errors greater than the error threshold.

In some embodiments, the receiver performance measurement logic is further configured to divide the plurality of output blocks into one or more sub-blocks, generate one or more binary vectors indicative of one or more error bits in the one or more sub-blocks, determine a sum of the one or more binary vectors associated with a sub-block of the one or more sub-blocks, compare the error threshold with the sum of the one or more binary vectors associated with the sub-block, increment the error counter if the sum of the one or more binary vectors associated with the sub-block is greater than the error threshold, and determine the probability of the occurrence of the one or more output blocks having the count of the one or more symbol errors greater than the error threshold based on the error counter and the codeword counter.

In some embodiments, the network device is a Serializer/De-serializer (SerDes).

In some embodiments, the receiver performance measurement logic is further configured to determine a Code Error Ratio (CER) based on the performance metric, and predict a Frame Loss ratio (FLR) associated with the network device based on the CER.

In some embodiments, the receiver performance measurement logic is further configured to determine a segment error budget for each segment of the one or more segments associated with the network device based on the performance metric.

In some embodiments, the receiver performance measurement logic is further configured to determine a mean time between the occurrence of one or more FEC codewords having the count of the one or more symbol errors equal to the error threshold.

In some embodiments, a device includes a processor, a memory communicatively coupled to the processor, and a receiver performance measurement logic. The logic is configured to store a plurality of error patterns wherein each error pattern includes a plurality of symbol errors corresponding to one or more Forward Error Correction (FEC) codewords, retrieve one or more symbol errors, access one or more segments associated with a network device, determine an error threshold for at least one segment, determine a probability of occurrence of the one or more FEC codewords having a count of the one or more symbol errors not less than the error threshold based on the plurality of error patterns and the error threshold, and generate a performance metric based on the probability of the occurrence of the one or more FEC codewords having the count of the one or more symbol errors not less than the error threshold.

In some embodiments, the receiver performance measurement logic is further configured to determine a segment error budget for each segment of the one or more segments associated with the network device based on the performance metric.

In some embodiments, a method includes storing a plurality of error patterns wherein each error pattern includes a plurality of symbol errors corresponding to one or more Forward Error Correction (FEC) codewords, retrieving one or more symbol errors, accessing one or more segments associated with a network device, determining an error threshold for at least one segment, and generating a performance metric based on the one or more symbol errors and the error threshold.

In some embodiments, determining a count of the one or more FEC codewords having a count of the one or more symbol errors equal to the error threshold, determining a probability of occurrence of the one or more FEC codewords having the count of the one or more symbol errors not less than the error threshold based on the plurality of error patterns and the count of FEC codewords having the count of the one or more symbol errors not less than the error threshold, and generating the performance metric based on the probability of the occurrence of the one or more FEC codewords having the count of the one or more symbol errors not less than the error threshold.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
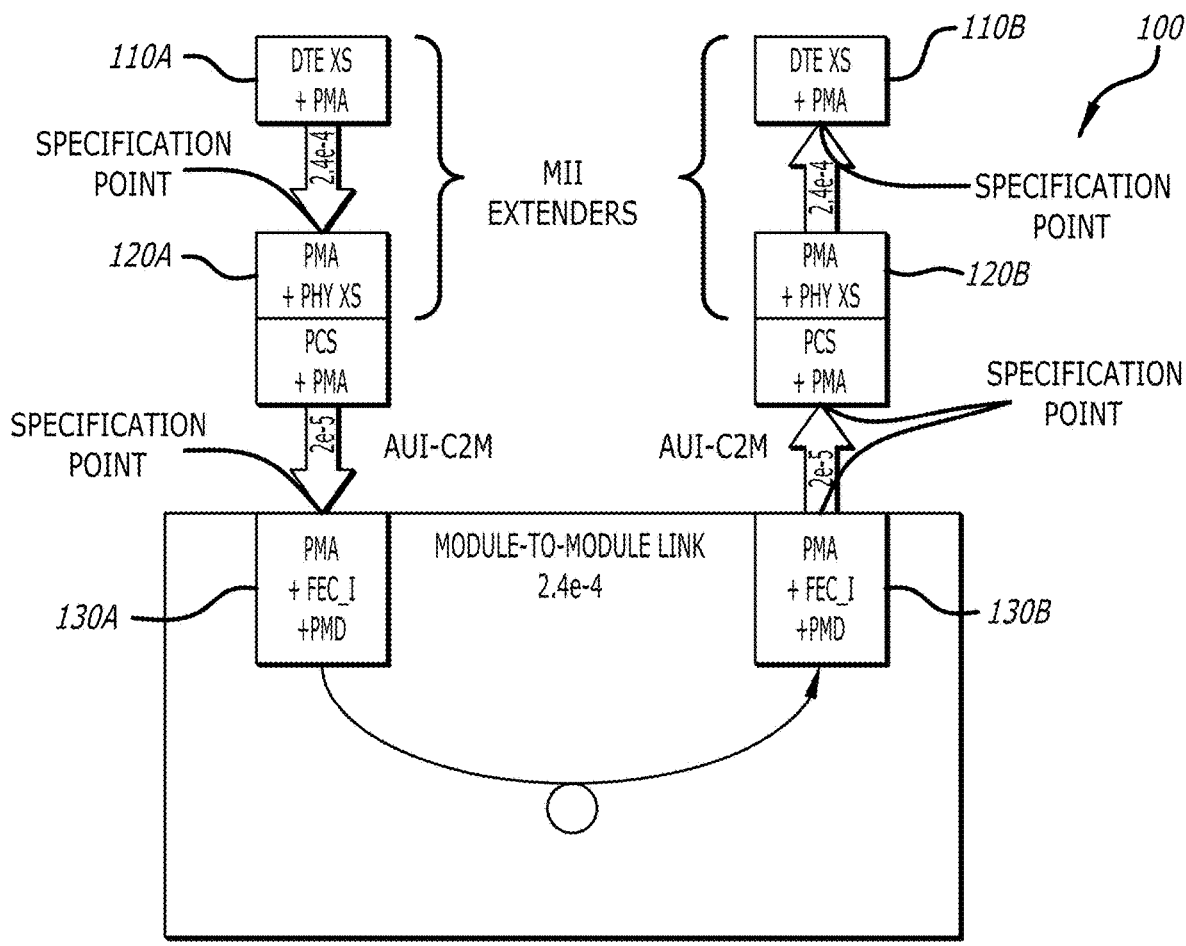
FIG. 1 is a conceptual illustration of error budgets with a plurality of segments of a network device, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

BER is not a reliable indicator of FLR for error correction in digital communication systems. While BER serves as a reasonable predictor of FLR when the errors are randomly distributed and uncorrelated, using BER to predict FLR fails when the errors are correlated. Several factors contribute to the correlated errors, for example, error bursts generated by Decision Feedback Equalization (DFE), Physical Coding Sublayer (PCS) lane multiplexing, Forward Error Correction (FEC) interleaving schemes, or uses of precoding techniques. When building systems with multiple components sourced from different vendors, it is a challenge to limit the errors within each component individually. This ensures that combined errors across all components together can be corrected by FEC to meet a specified end-to-end performance, as represented by FLR. Therefore, there is a need to develop metrics for each component in a way that accurately predicts their impact on overall system's performance and can be quantitatively measured in isolation without using FEC encoders and decoders.

In response to the issues described above, devices and methods are discussed herein that determine performance metrics for a receiver. In many embodiments, devices and methods are discussed herein that express receiver performance as a metric that encompasses the rate of errors as well as their statistics that affect error correction code performance. Also disclosed is a circuit that enables measurement of this metric with one or more test patterns, including by way of non-limiting example, Pseudo-Random Binary Sequences (PRBS) such as PRBS31.

In a number of embodiments, a network device such as the receiver can store error patterns in one or more error bin registers. In some embodiments, for example, the error patterns can include Forward Error Correction (FEC) codewords. The network device may retrieve symbol errors from the error patterns. In FEC, a transmitter can have encoded messages with Error-Correcting Code (ECC). The network device such as the receiver can detect the errors in the messages based on the ECC. The symbol errors may include one or more symbols or bits that are erroneous. The network device can access one or more segments associated with the network device and can determine an error threshold for each segment. The error threshold may be based on a predefined Bit Error Rate (BER) level. The network device may generate a performance metric for the segments based on the symbol errors and the error thresholds.

In various embodiments, the device can determine a count of the FEC codewords that have a count of the symbol errors equal to the error threshold. The device may determine a probability of occurrence of the FEC codewords having the count of the symbol errors not less than the error threshold based on the count of the FEC codewords that have the count of the symbol errors equal to the error threshold. The device may utilize a Complementary Cumulative Distribution Function (CCDF) function to determine the probability of occurrence of the FEC codewords having the count of the symbol errors not less than the error threshold. The device can generate the performance metric based on the probability of the occurrence of the FEC codewords having the count of the symbol errors not less than the error threshold.

In additional embodiments, the device may generate performance metrics associated with each segment coupled to the network device. The device can generate a receiver performance metric associated with the network device based on the performance metrics associated with the segments coupled to the network device. Here, the network device can operate in a Physical Coding Sublayer (PCS).

In further embodiments, the device can generate predefined test patterns such as PRBS test patterns. The device may apply the PRBS test patterns to the network device. The device can receive output blocks from the network device in response to the PRBS test patterns. The device may determine the count of the symbol errors in an output block and compare the count of the symbol errors with the error threshold. The device can increment an error counter if the count of the symbol errors in the output block is greater than the error threshold. The device may determine a probability of occurrence of the output blocks having the count of symbol errors greater than the error threshold. The device can generate the performance metric based on the probability of the occurrence of the FEC codewords having the count of symbol errors greater than the error threshold. The device may apply the PRBS test patterns and test the network device for a long enough time period to ensure that the performance metric meets the error threshold with adequate confidence.

In many more embodiments, for checking or counting the symbol errors in the output blocks, the device may divide the output blocks into one or more sub-blocks. The device can generate one or more binary vectors indicative of one or more error bits in the one or more sub-blocks. The device may determine a sum of the one or more binary vectors associated with a sub-block. The device can compare the error threshold with the sum of the one or more binary vectors associated with the sub-block. The device may increment the error counter if the sum of the one or more binary vectors associated with the sub-block is greater than the error threshold. The device may increment a codeword counter after checking an output block for the symbol errors. The device can determine the probability of the occurrence of the FEC codewords having the count of the symbol errors greater than the error threshold based on the error counter and the codeword counter. Here, the network device may be a Serializer/De-serializer (SerDes).

In many additional embodiments, the device can determine a Code Error Ratio (CER) based on the performance metrics of the segments or the receiver performance metric of the network device. The device may predict a Frame Loss ratio (FLR) associated with the network device based on the CER. The device can additionally determine a segment error budget for each segment associated with the network device based on the performance metric. The device may also determine a mean time between the occurrence of the FEC codewords having the count of the symbol errors equal to the error threshold.

Advantageously, the receiver performance metric can be utilized for testing compliance of the network device. The method of determining the receiver performance metric can be utilized by any test equipment that tests compliance of the network device. The method can also be utilized without the test equipment for any network devices that report the performance metrics. The method may be utilized to develop efficient and accurate performance measurement or error correction in Ethernet. The method can be especially useful for measuring performances of the network devices that operate on high data transmission speeds such as, but not limited to, 200 GB/s per lane of data transmission. Furthermore, the receiver performance metric encompasses a rate of the errors as well as statistics and factors that affect error correction code performance. The method can be utilized with existing PRBS test patterns. By utilizing the method, the receiver performance metric can substitute existing BER metric which is currently utilized to predict FLR. The method can be implemented in a reasonable time. The receiver performance metric generated by the method is a better predictor for FLR than BER. The method also facilitates specification of error budgets for the network devices and the segments thereof by utilizing the receiver performance metric such that total FLR is under a required or specified error threshold. The method is especially suitable for Ethernet Physical Layer devices (PHYs) and 800G Ethernet.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of error budgets with a plurality of segments of a network device 100, in accordance with various embodiments of the disclosure is shown. In many embodiments, the network device 100 may include multiple segments as shown in FIG. 1, including Data Transmission Equipment (DTE) Extenders (XS) 110A & 110B, Physical Layer (PHY) XS 120A & 120B, and physical Attachment Unit Interface (AUI) 130A & 130B. In some embodiments, for example, for allocation purposes, it may be initially assumed that errors are uncorrelated. This can be usually a mathematically time invariant and memoryless process. Under these conditions, Code Error Ratio (CER)=1.5e-11 may be achieved with Bit Error Rate (BER)=2.93e-4. A number of assumptions can be made, including for example, that the BER=2.4e-4 for the module-to-module link, the BER=2e-5 for each host AUI-C2M, and total BER including C2M segments may be 2.9e-4, which can result in CER=7.9e-12. If each MII extender may be allocated CER=3.8e-12, the total CER can be 1.5e-11. For example, CER=3.8-12 may require BER=2.6e-4 within the extenders. For example, in PHYs defined by IEEE 802.3bs, the Physical Medium Dependent (PMD) sublayers may be allocated a BER of 2.4e-4, and each AUI segment can be allocated 1e-5. With 4 AUIs, the total BER allocation may be 2.8e-4. This budgeting can leave a small margin for the effect of Decision Feedback Equalization (DFE) related error bursts or correlated errors (based on analysis for C2C at 50 Gb/s per lane). PMD specification may also require meeting a Frame Loss Ratio (FLR) limit, but as those skilled in the art will appreciate, this may be difficult to obtain. This approach may face various challenges. For example, DFEs/MLSEs have become common at 100 Gb/s per lane, and are expected to be used 200 Gb/s per lane, creating non-negligible error bursts on both C2C and C2M. There can also be other sources of correlated errors (for example, low frequency jitter and noise). Segments with the correlated errors may have a different effect on Reed Solomon Forward Error Correction (RS-FEC) than their measured BER suggests. Measurement of average BER does not capture an error distribution within codewords over time. As a result, it is common to apply large guard bands below the BER specified by IEEE 802.3. It may be understood to a person skilled in the art that the error budgets and examples given herein are only exemplary and that the embodiments described herein may also be applied to different error budges and values and to different segments of various devices in Ethernet.

Although a specific embodiment for the network device 100 for carrying out the various steps, processes, methods, and operations described herein is discussed with respect to FIG. 1, any of a variety of systems and/or processes may be utilized in accordance with embodiments of the disclosure. For example, the network device 100 may specify different error budgets for different segments associated with the network device 100. The elements depicted in FIG. 1 may also be interchangeable with other elements of FIGS. 2-12 as required to realize a particularly desired embodiment.

Figure 2:
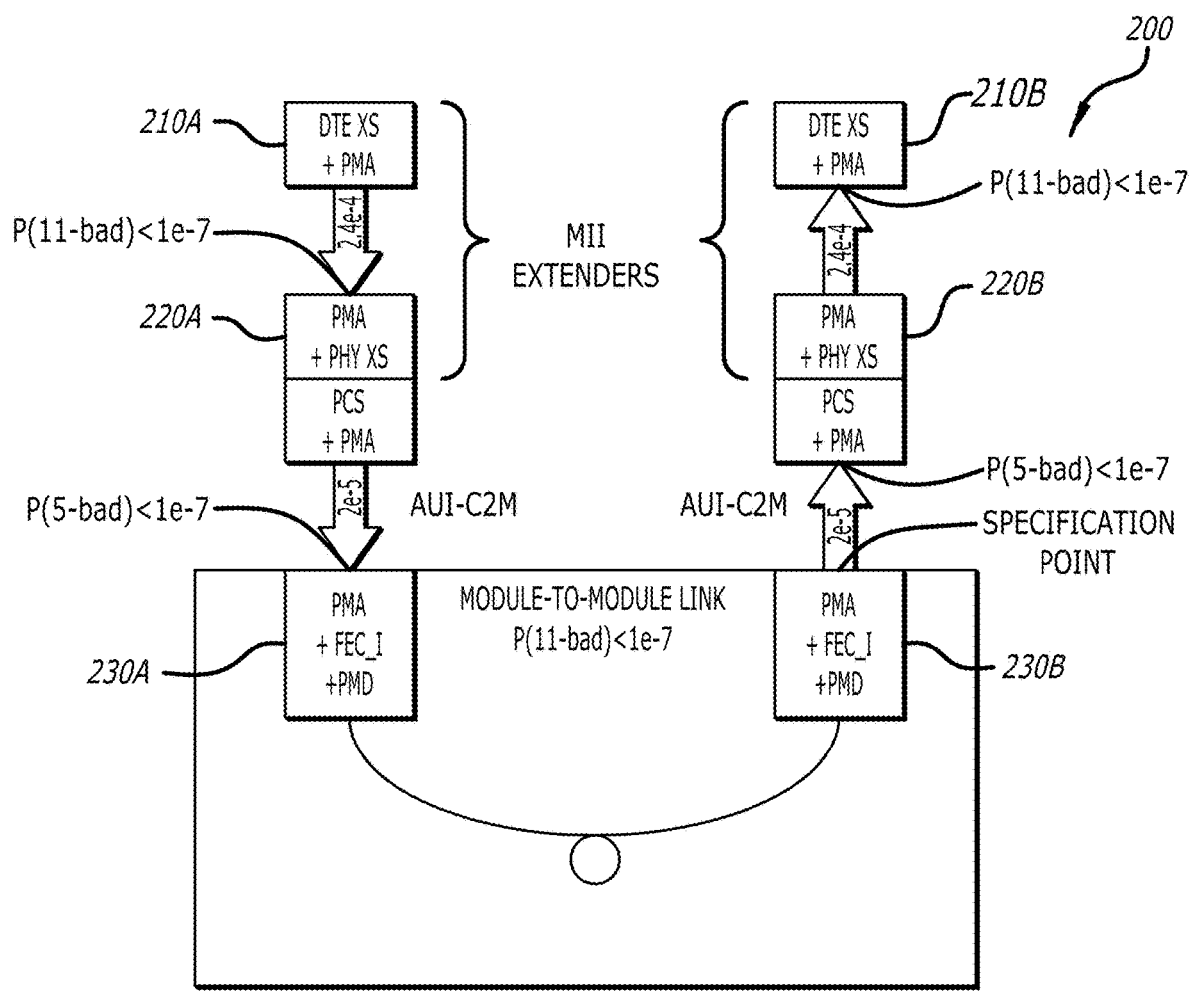
FIG. 2 is a conceptual illustration of performance metrics of a network device, in accordance with various embodiments of the disclosure.

Referring to FIG. 2, a conceptual illustration of performance metrics of a network device 200, in accordance with various embodiments of the disclosure is shown. In many embodiments, the network device 200 may include multiple segments as shown in FIG. 2, including Data Transmission Equipment (DTE) Extenders (XS) 210A & 210B, Physical Layer (PHY) XS 220A & 220B, and physical Attachment Unit Interface (AUI) 230A & 230B. In some embodiments, for example, for the module-to-module link and for the Media-Independent Interface (MII) Extender link, a probability of 11-bad codewords is less than 1e-7. For example, a probability of 1.3e-7 can correspond to a random BER of 2.4e-4. For the AUI segments, the probability of 5-bad codewords is less than 1e-7. Similarly, a probability of 1.1e-7 can correspond to a random BER of 2e-5. These specifications may be verified with confidence >99% with relatively short tests. At 200 Gb/s per lane, each lane comprises: For "2.4e-4 equivalent", up to seven 11-bad events in 5 seconds; and for "2e-5 equivalent", up to seven 5-bad events in 5 seconds. In each of these scenarios, measurement time captures any low-frequency effects that a Device Under Test (DUT) or the network device 200 may have. In practical testing, other values of an error threshold (k) and/or lower probabilities can be utilized, e.g., for margining. It may be understood to a person skilled in the art that the values of performance metrics, error thresholds, BER, or FLR given herein are only exemplary and that the embodiments described herein may also be applied to different performance metrics, BER, or FLR values and to different segments of various devices in Ethernet.

In various embodiments, three aspects are described: 1) Definition of a metric to replace BER, which is more predictive of the performance metric, FLR, and can be measured in a reasonable time; 2) Specification of error limits to components using the new metric such that the total FLR is expected to be satisfactory; and 3) An algorithm, suitable for hardware implementation, to measure the new metric with test patterns commonly used for BER measurement (such as PRBS31). This solution is to be proposed for the next generation of Ethernet PHYs. 800G Ethernet will be used as an example. The values of BER, FEC codeword length and error correction capability, and data rates should be considered as specific examples.

Although a specific embodiment for the network device 200 for carrying out the various steps, processes, methods, and operations described herein is discussed with respect to FIG. 2, any of a variety of systems and/or processes may be utilized in accordance with embodiments of the disclosure. For example, the network device 200 may specify the performance metrics for different segments of the network device 200 that satisfy a specified or predetermined error threshold as expressed by FLR. The elements depicted in FIG. 2 may also be interchangeable with other elements of FIG. 1 and FIGS. 3-12 as required to realize a particularly desired embodiment.

Figure 3:
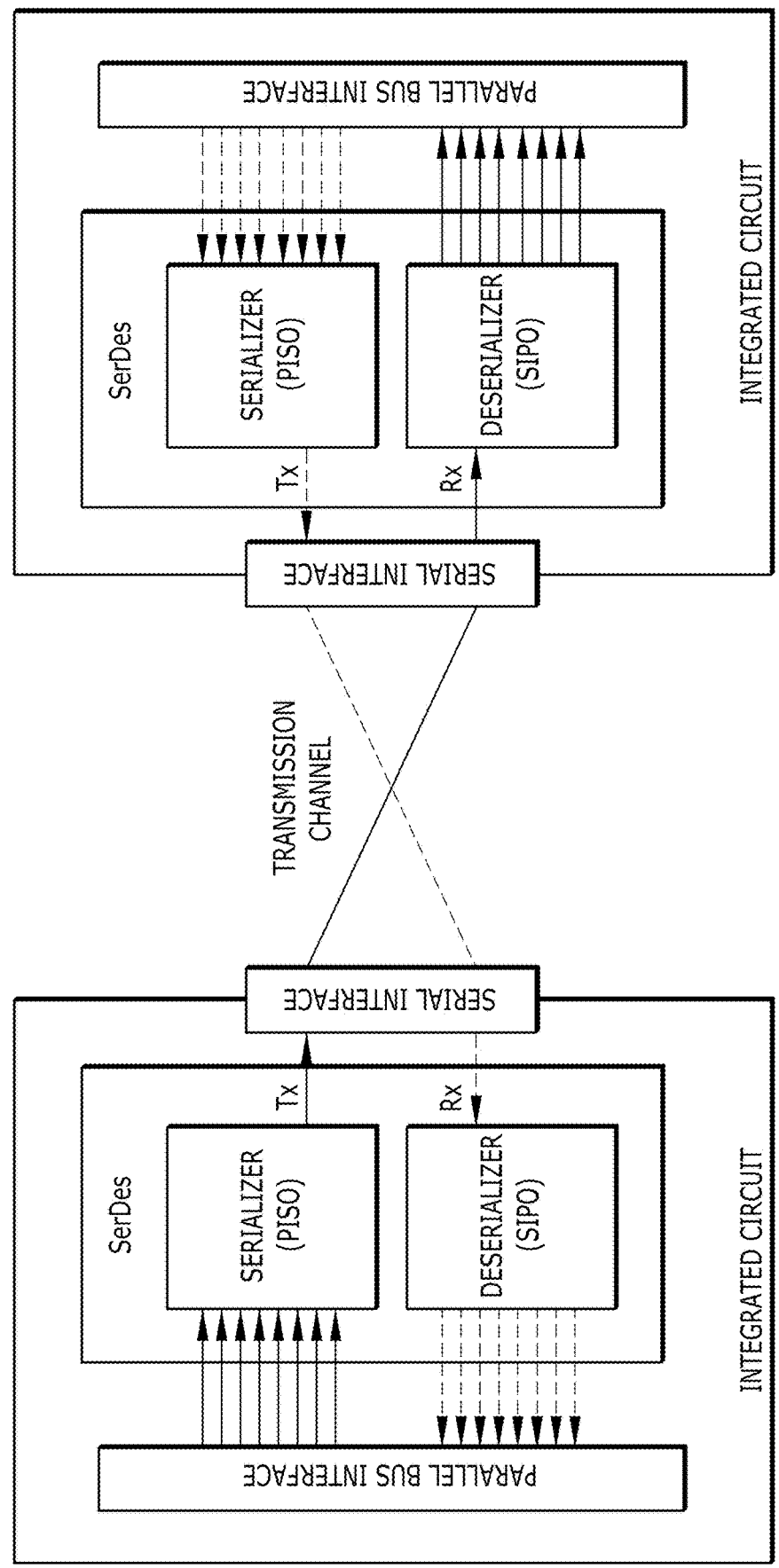
FIG. 3 is a schematic block diagram of a plurality of Serializer/Deserializer (SerDes) chips exchanging data, in accordance with various embodiments of the disclosure.

Referring to FIG. 3, a schematic block diagram of a plurality of Serializer/Deserializer (SerDes) chips exchanging data, in accordance with various embodiments of the disclosure is shown. In many embodiments, a SerDes chip might also include an encoder, clock multiplier unit, physical coding sub-block, clock and data recovery unit, input and output staging areas, or other various components. A phase-locked loop (PLL) is shown, which may be a closed-loop, feedback-control system that is frequency and phase sensitive. In some embodiments, the PLL generates a signal at a serial frequency that is based on the phase and frequency of the reference clock. The PISO uses the PLL signal when serializing the parallel data input. The SIPO also uses the PLL as a reference clock when deserializing data. In some embodiments, the PLL may be internal or external to the SerDes blocks. Furthermore, it should be appreciated that each block may comprise its own PLL, or the two blocks may share the same PLL.

In a number of embodiments, the SerDes embeds data address and control signals along with parallel data input. The serial stream may be outputted with an additional clock signal that is used when deserializing the data. In some embodiments, an embedded clock may be utilized, wherein the SerDes embeds both the parallel data input and reference clock signal into a single serial stream. Two clock bits may be embedded into the stream at every cycle to create a frame around each bitstream 8b/10b. In such configurations, the SerDes converts each byte from the parallel data input to a 10-bit symbol (8 bits plus 2 bits) and embeds the symbols into the serial stream. The encoding scheme achieves DC balance in the serial transmission channel by limiting the disparity in the number of consecutive 0s or 1s bit interleaved. The SerDes may multiplex several slower serial streams into a single, faster stream by interleaving the bits from the input streams.

Although a specific embodiment for the SerDes chips for carrying out the various steps, processes, methods, and operations described herein is discussed with respect to FIG. 3, any of a variety of systems and/or processes may be utilized in accordance with embodiments of the disclosure. For example, the SerDes chips may measure or specify their performance metrics. The elements depicted in FIG. 3 may also be interchangeable with other elements of FIGS. 1-2 and FIGS. 4-12 as required to realize a particularly desired embodiment.

Figure 4:
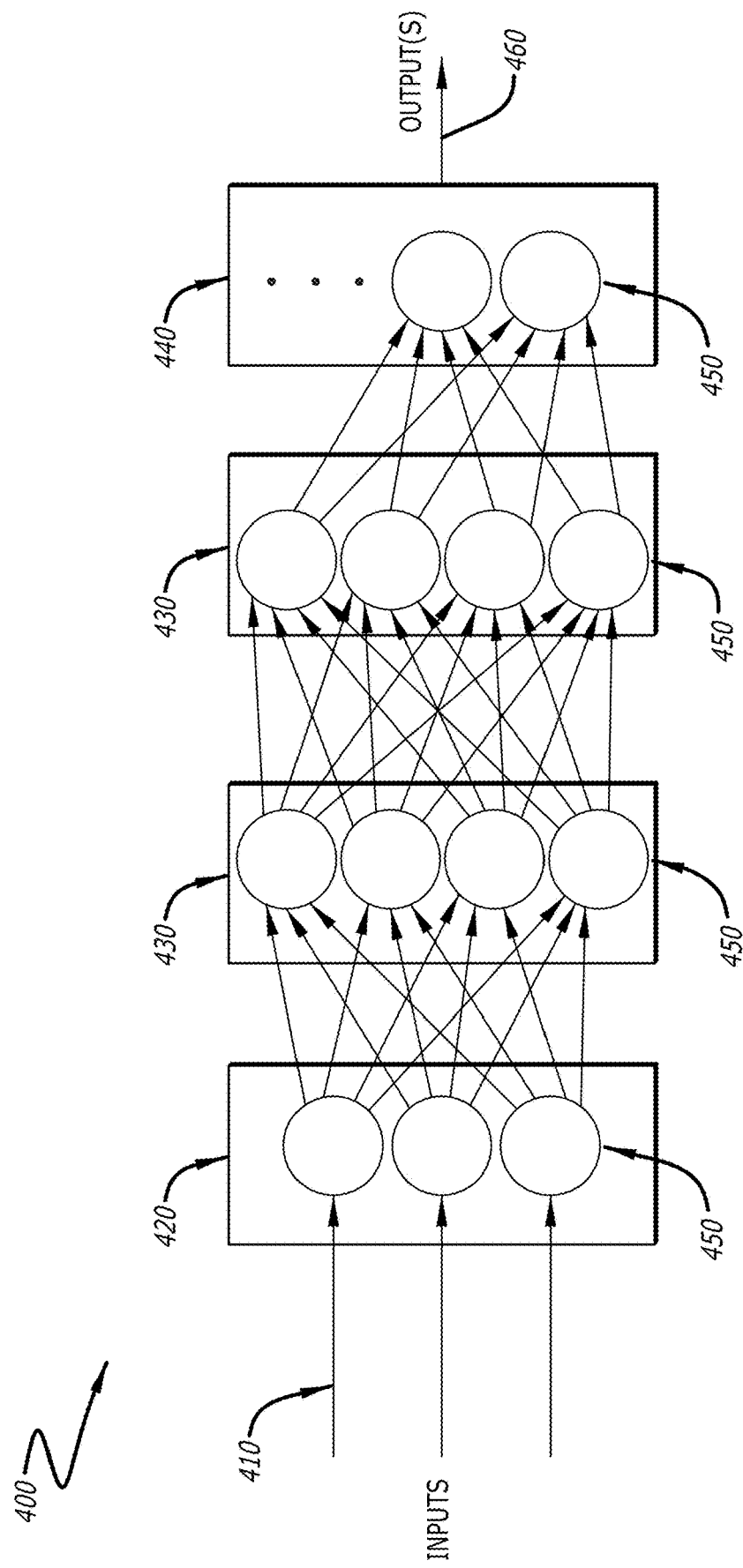
FIG. 4 is a conceptual illustration of an artificial neural network, in accordance with various embodiments of the disclosure.

Referring to FIG. 4, a conceptual illustration of an artificial neural network 400, in accordance with various embodiments of the disclosure is shown. As those skilled in the art will recognize, various methods of machine learning models can be utilized to achieve desired outcomes efficiently. For example, some embodiments may utilize decisions trees, random forests, support vector machines, naïve Bayes, or K-nearest neighbors algorithms. However, artificial neural networks have increased in popularity, especially in deep learning techniques where detection of complex patterns in data and the ability to solve a wide range of problems has been desired. In various embodiments, an artificial neural network may be utilized. Artificial neural networks are a type of machine learning model inspired by the structure and function of the human brain, and often consist of three main types of layers: the input layer, the output layer, and one or more intermediate (also called hidden) layers.

In many embodiments, the input layer is responsible for receiving input data, which could be anything from an image to a text document to numerical values. Each input feature can be represented by a node in the input layer. Conversely, the output layer is often responsible for producing the output of the network, which could be, for example, a prediction or a classification. The number of nodes in the output layer can depend on the task at hand. For example, if the task is to classify images into ten different categories, there would be ten nodes in the output layer, each representing a different category.

In a number of embodiments, the intermediate layers are where the specialized connections are made. These intermediate layers are responsible for transforming the input data in a non-linear way to extract meaningful features that can be used for the final output. In various embodiments, a node in an intermediate layer can take as an input a weighted sum of the outputs from the previous layer, apply a non-linear activation function to it, and pass the result on to the next layer. The weights of the connections between nodes in the layers are learned during training. This training can utilize backpropagation, which may involve calculating the gradient of the error with respect to the weights and adjusting the weights accordingly to minimize the error.

In various embodiments, at a high level, the artificial neural network 400 depicted in the embodiment of FIG. 4 includes a number of inputs 410, an input layer 420, one or more intermediate layers 430, and an output layer 440. The artificial neural network 400 may comprise a collection of connected units or nodes called artificial neurons 450, which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the artificial neural network 400 depicted in FIG. 4 is shown as an illustrative example, and various embodiments may comprise artificial neural networks that can accept more than one type of input and can provide more than one type of output.

In additional embodiments, the signal at a connection between artificial neurons is a value, and the output of each artificial neuron is computed by some nonlinear function (called an activation function) of the sum of the artificial neuron's inputs. Often, the connections between artificial neurons are called "edges" or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 420) to the last layer (the output layer 440), possibly after traversing one or more intermediate layers (also called hidden layers) 430.

In further embodiments, the inputs to an artificial neural network may vary depending on the problem being addressed. In object detection for example, the inputs may be data representing values for certain corresponding actual measurements or values within the object to be detected. In one embodiment, the artificial neural network 400 comprises a series of hidden layers in which each neuron is fully connected to neurons of the next layer. The artificial neural network 400 may utilize an activation function such as sigmoid, nonlinear, or a rectified linear unit (ReLU), upon the sum of the weighted inputs, for example. The last layer in the artificial neural network may implement a regression function to produce the classified or predicted classifications output for object detection as output 460. In further embodiments, a sigmoid function can be used, and the prediction may need raw output transformation into linear and/or nonlinear data.

Although a specific embodiment for an artificial neural network machine learning model suitable for carrying out the various steps, processes, methods, and operations described herein is discussed with respect to FIG. 4, any of a variety of systems and/or processes may be utilized in accordance with embodiments of the disclosure. For example, the artificial neural network may be external operated, such as through a cloud-based service, or a third-party service. The elements depicted in FIG. 4 may also be interchangeable with other elements of FIGS. 1-3 and FIGS. 5-12 as required to realize a particularly desired embodiment.

Figure 5:
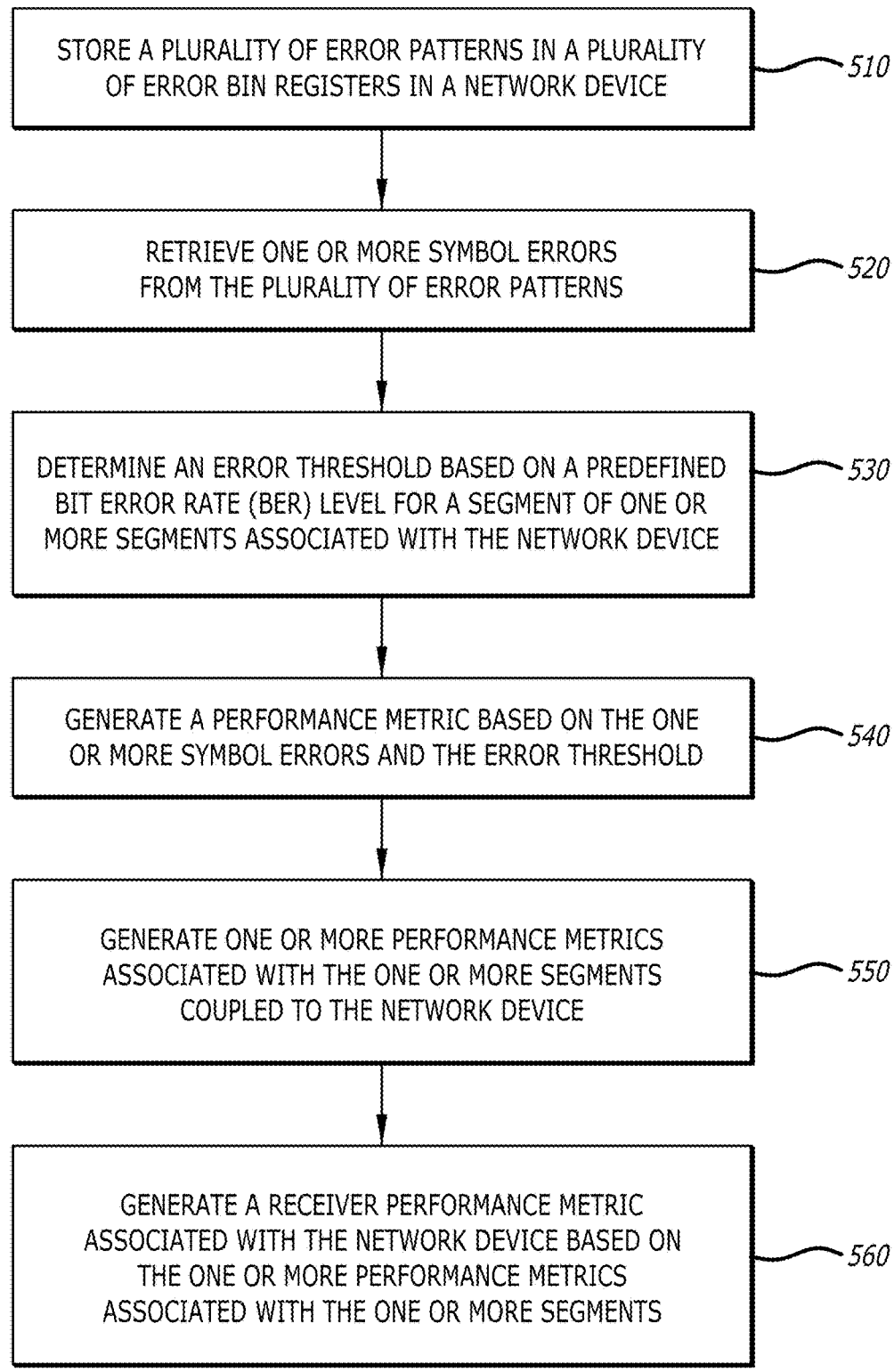
FIG. 5 is a flowchart depicting a process for generating a receiver performance metric, in accordance with various embodiments of the disclosure.

Referring to FIG. 5, a flowchart depicting a process 500 for generating a receiver performance metric, in accordance with various embodiments of the disclosure is shown. In many examples, the process 500 can store a plurality of error patterns in a plurality of error bin registers in a network device (block 510). In some embodiments, the network device may be the DUT or an Equipment Under Test (EUT). In certain embodiments, the network device may be Ethernet Physical Layer device (PHY). In more embodiments, the error patterns may be stored within the network device or in a separate storage unit outside the network device. In some more embodiments, the error patterns may include FEC codewords. In numerous embodiments, the FEC may utilize Low Density Parity Check (LDPC) codes, Reed-Solomon (RS) codes, Turbo codes, Bose-Chaudhuri-Hocquenghem (BCH) codes, Convolutional codes, Hamming codes, or any such error correction codes. In many further embodiments, the stored error patterns can be used for measuring one or more performance metrics of the network device.

In a number of embodiments, the process 500 may retrieve one or more symbol errors from the plurality of error patterns (block 520). In some embodiments, the symbol errors can be specific instances where a transmitted symbol or bit is received in a corrupted or incorrect form. In certain embodiments, the process 500 can determine a count of symbol errors in the plurality of error patterns. In more embodiments, the process 500 may determine locations or frequencies of the symbol errors in the plurality of error patterns. In numerous embodiments, the symbol errors may occur dur to random or uncorrelated errors. In many further embodiments, the symbol errors can occur due to correlated errors.

In various embodiments, the process 500 can determine the error threshold based on a predefined BER level for a segment of one or more segments associated with the network device (block 530). In some embodiments, different error thresholds can be defined for different use-cases. In certain embodiments, the error threshold may be defined to meet a technological standard or a technical specification. In more embodiments, the error threshold can be indicative of an acceptable level of errors for a specific segment. In some more embodiments, each segment may have a different error threshold.

In additional embodiments, the process 500 may generate the performance metric based on the one or more symbol errors and the error threshold (block 540). In some embodiments, the performance metric of the segment may quantify a performance of the segment in terms of an error rate and a compliance of the segment with the error threshold. In certain embodiments, the process 500 can determine a segment error budget allocated to the segment. In more embodiments, the process 500 can check if the performance metric of the segment is within the allocated segment error budget. In some more embodiments, the segment error budget allocated to the segment may depend on the type of segment, such as but not limited to, electrical or optical links connected to the network device.

In further embodiments, the process 500 can generate one or more performance metrics associated with the one or more segments coupled to the network device (block 550). In some embodiments, the network device may have multiple segments of different types, for example, the electrical and optical segments. In certain embodiments, the process 500 can utilize different methods to determine the performance metrics of different segments based on the types of the segments. In more embodiments, the performance metrics of different segments can comply to different standards or specifications depending on the types of the segments.

In many more embodiments, the process 500 can generate a receiver performance metric associated with the network device based on the one or more performance metrics associated with the one or more segments (block 560). In some embodiments, the receiver performance metric may be indicative of the compliance of the network device to the standard or the specification. In certain embodiments, the receiver performance metric can be determined mathematically by utilizing a Complementary Cumulative Distribution Function (CCDF) for a probability of errors. In more embodiments, the receiver performance metric can be determined by testing the network device with various PRBS test patterns.

Although a specific embodiment for the process 500 for generating the receiver performance metric for carrying out the various steps, processes, methods, and operations described herein is discussed with respect to FIG. 5, any of a variety of systems and/or processes may be utilized in accordance with embodiments of the disclosure. For example, the receiver performance metric can be calculated based on CCDF or based on test results of the PRBS test patterns. The elements depicted in FIG. 5 may also be interchangeable with other elements of FIGS. 1-4 and FIGS. 6-12 as required to realize a particularly desired embodiment.

Figure 6:
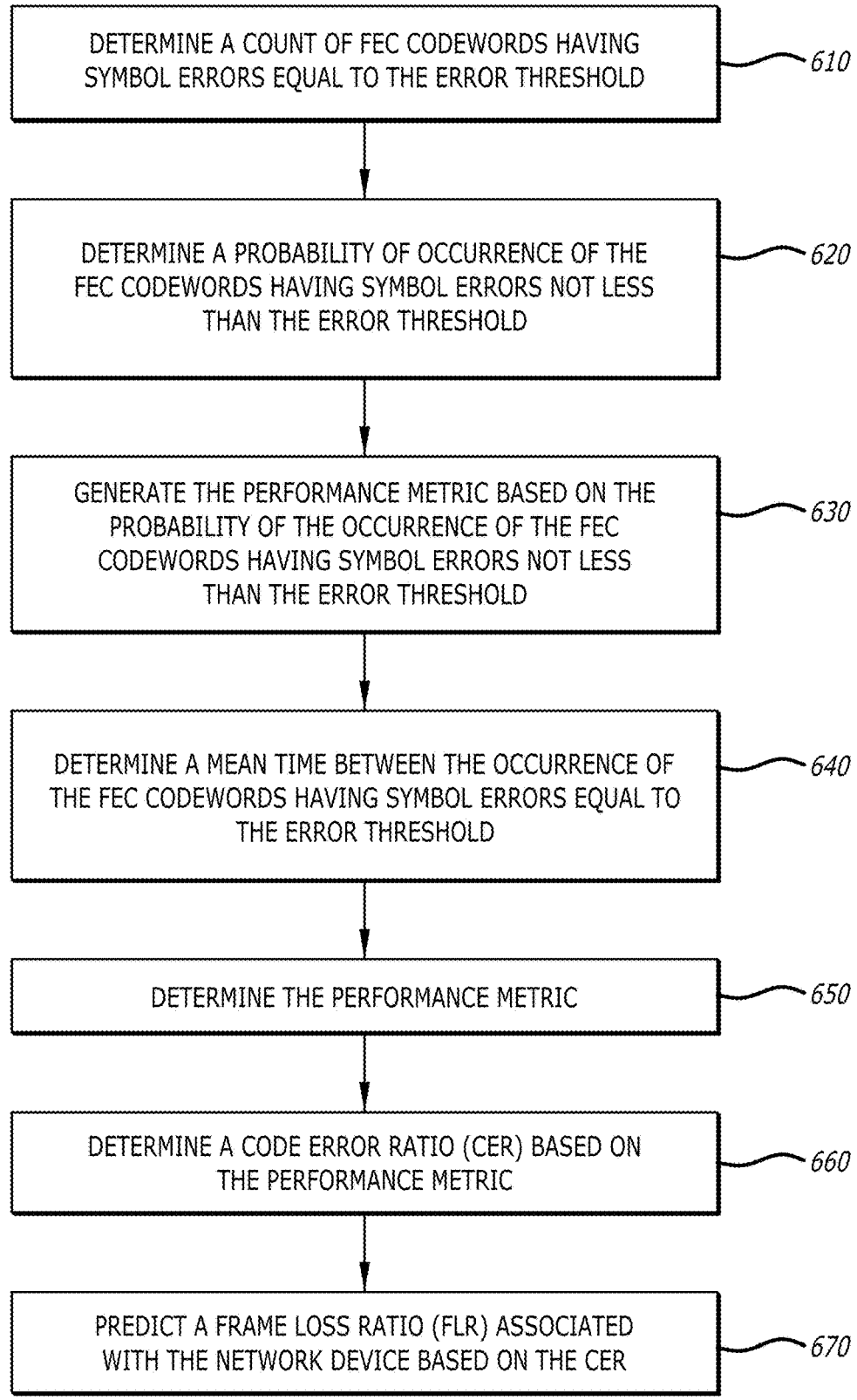
FIG. 6 is a flowchart depicting a process for predicting Frame Loss ratio (FLR), in accordance with various embodiments of the disclosure.

Referring to FIG. 6, a flowchart depicting a process 600 for predicting FLR, in accordance with various embodiments of the disclosure is shown. In many embodiments, the process 600 may determine a count of FEC codewords having symbol errors equal to the error threshold (block 610). In some embodiments, process 600 can determine the FEC codewords having the count of symbol errors less than or equal to the error threshold. In certain embodiments, the FEC codewords having the count of symbol errors less than or equal to the error threshold may be correctable, whereas the FEC codewords having the count of symbol errors more than the error threshold may be uncorrectable.

In a number of embodiments, the process 600 can determine a probability of occurrence of the FEC codewords having symbol errors not less than the error threshold (block 620). In some embodiments, the process 600 may determine the probability of occurrence of the FEC codewords based on a sufficient number of codewords stored in the error bin registers. In certain embodiments, for SerDes, the probability of output blocks having a given number of errors may be determined by testing the network device with the PRBS patterns for a sufficient amount of time.

In various embodiments, the process 600 may generate the performance metric based on the probability of the occurrence of the FEC codewords having symbol errors not less than the error threshold (block 630). In some embodiments, the process 600 can determine the performance metric based on the standard or specification. In certain embodiments, the performance metric may be based on a predefined BER budget.

In additional embodiments, the process 600 can determine a mean time between the occurrence of the FEC codewords having symbol errors equal to the error threshold (block 640). In some embodiments, for the error threshold (k), the process 600 can calculate the mean time between k-bad events, i.e., MTBE(k), by utilizing data rate and codeword length for each k. In certain embodiments, the process 600 may utilize MTBE(k) to determine how frequently critical errors occur, i.e., a frequency of k-bad events.

In further embodiments, the process 600 may determine the performance metric (block 650). In some embodiments, the process 600 can determine the performance metrics for each segments. In certain embodiments, the process 600 may determine the receiver performance metric of the network device based on the performance metrics of the segments coupled to the network device. In more embodiments, the receiver performance metric may be indicative of a predicted BER level or FLR level.

In many more embodiments, the process 600 can determine a CER based on the performance metric (block 660). In some embodiments, the CER may quantify a count of FEC codewords with the count of symbol errors exceeding the error threshold (k) in relation to a total number of FEC codewords. In certain embodiments, the CER may indicate an error rate for the network device.

In many additional embodiments, the process 600 may predict a FLR associated with the network device based on the CER (block 670). In some embodiments, the FLR may be indicative of an estimate of losing entire frames or packets due to the symbol errors in the FEC codewords. In certain embodiments, the receiver performance metric is a better predictor of FLR than BER.

Although a specific embodiment for the process 600 for predicting FLR for carrying out the various steps, processes, methods, and operations described herein is discussed with respect to FIG. 6, any of a variety of systems and/or processes may be utilized in accordance with embodiments of the disclosure. For example, the process 600 may utilize the probability of k-bad events to predict the FLR. The elements depicted in FIG. 6 may also be interchangeable with other elements of FIGS. 1-5 and FIGS. 7-12 as required to realize a particularly desired embodiment.

Figure 7:
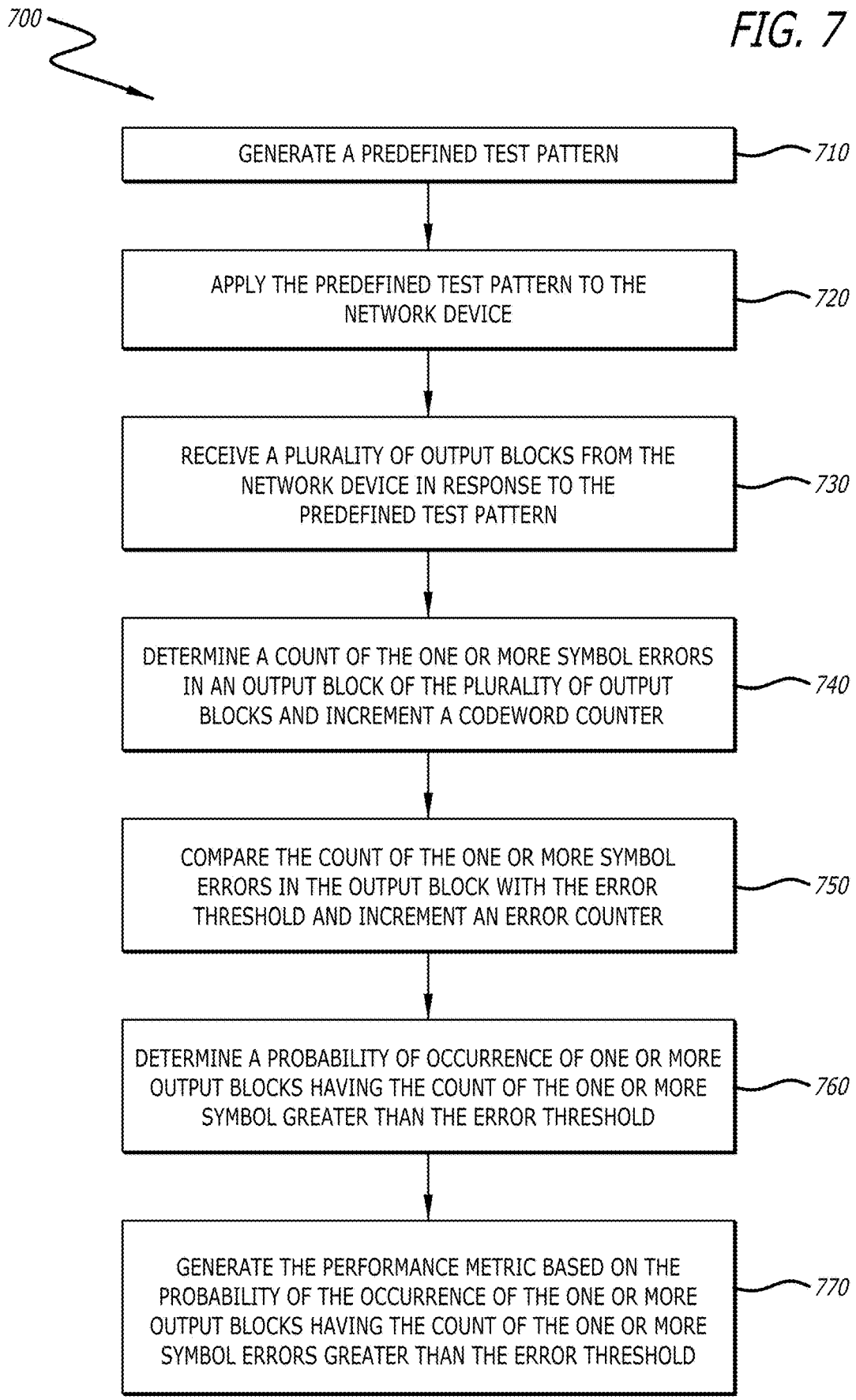
FIG. 7 is a flowchart depicting a process for generating a performance metric, in accordance with various embodiments of the disclosure.

Referring to FIG. 7, a flowchart depicting a process 700 for generating a performance metric, in accordance with various embodiments of the disclosure is shown. In many embodiments, the process 700 can generate a predefined test pattern (block 710). In some embodiments, the process 700 may be performed by the device or the testing device. In certain embodiments, the process 700 can utilize a PRBS generator to generate the PRBS test patterns.

In a number of embodiments, the process 700 may apply the predefined test pattern to the network device (block 720). In some embodiments, the process 700 can be implemented by the device or the testing device to apply the PRBS patterns to the network device or the DUT. In certain embodiments, the network device or the DUT may be a SerDes under test.

In various embodiments, the process 700 can receive a plurality of output blocks from the network device in response to the predefined test pattern (block 730). In some embodiments, the PRBS patterns applied to the network device may be a bitstream of known statistical characteristics. In certain embodiments, a length and type of the PRBS patterns may depend on testing requirements of the network device or the DUT such as the SerDes. In more embodiments, the output blocks can be blocks of bits extracted from an output of the network device in response to the PRBS pattern. In some more embodiments, the output blocks can be of same size as FEC codewords. In numerous embodiments, the output blocks may be FEC codewords generated by the network device. In many further embodiments, for example, if the size of the FEC codeword is 5440 bits, the PRBS output can be processed in terms of the output blocks of size 5440 bits, to identify error statistics per output block, without performing FEC.

In additional embodiments, the process 700 may determine a count of the one or more symbol errors in an output block of the plurality of output blocks and increment a codeword counter (block 740). In some embodiments, the process 700 can divide the output block in a number of sub-blocks, for e.g., into four sub-blocks. In certain embodiments, the process 700 may count a number of processed output blocks or a number of sub-blocks in the output blocks. In more embodiments, the process 700 can increment the codeword counter by the number of sub-blocks that the FEC codewords is divided into, for e.g., the process 700 can increment the codeword counter by four.

In further embodiments, the process 700 can compare the count of the one or more symbol errors in the output block with the error threshold and increment an error counter (block 750). In some embodiments, the process 700 may further divide the sub-blocks into symbols of a predetermined number of bits and check the bits for errors. In certain embodiments, the process 700 can increment the error counter if a number of erroneous bits exceeds the error threshold.

In many more embodiments, the process 700 may determine a probability of occurrence of one or more output blocks having the count of the one or more symbol greater than the error threshold (block 760). In some embodiments, the process 700 can determine a number of k-bad events, that is, when the FEC codeword includes k or more symbol errors. In certain embodiments, the process 700 may determine the probability of k-bad events by dividing the codeword counter by the error counter.

In many additional embodiments, the process 700 can generate the performance metric based on the probability of the occurrence of the one or more output blocks having the count of the one or more symbol errors greater than the error threshold (block 770). In some embodiments, the process 700 may apply the PRBS patterns to the network device for a long enough time period to determine the probability of the k-bad events with adequate certainty. In certain embodiments, the process 700 can determine the performance metric based on the probability of k-bad events.

Although a specific embodiment for the process 700 for predicting FLR for carrying out the various steps, processes, methods, and operations described herein is discussed with respect to FIG. 7, any of a variety of systems and/or processes may be utilized in accordance with embodiments of the disclosure. For example, the process 700 can determine the performance metrics by utilizing the PRBS test pattern testing for the SerDes. The elements depicted in FIG. 7 may also be interchangeable with other elements of FIGS. 1-6 and FIGS. 8-12 as required to realize a particularly desired embodiment.

Figure 8:
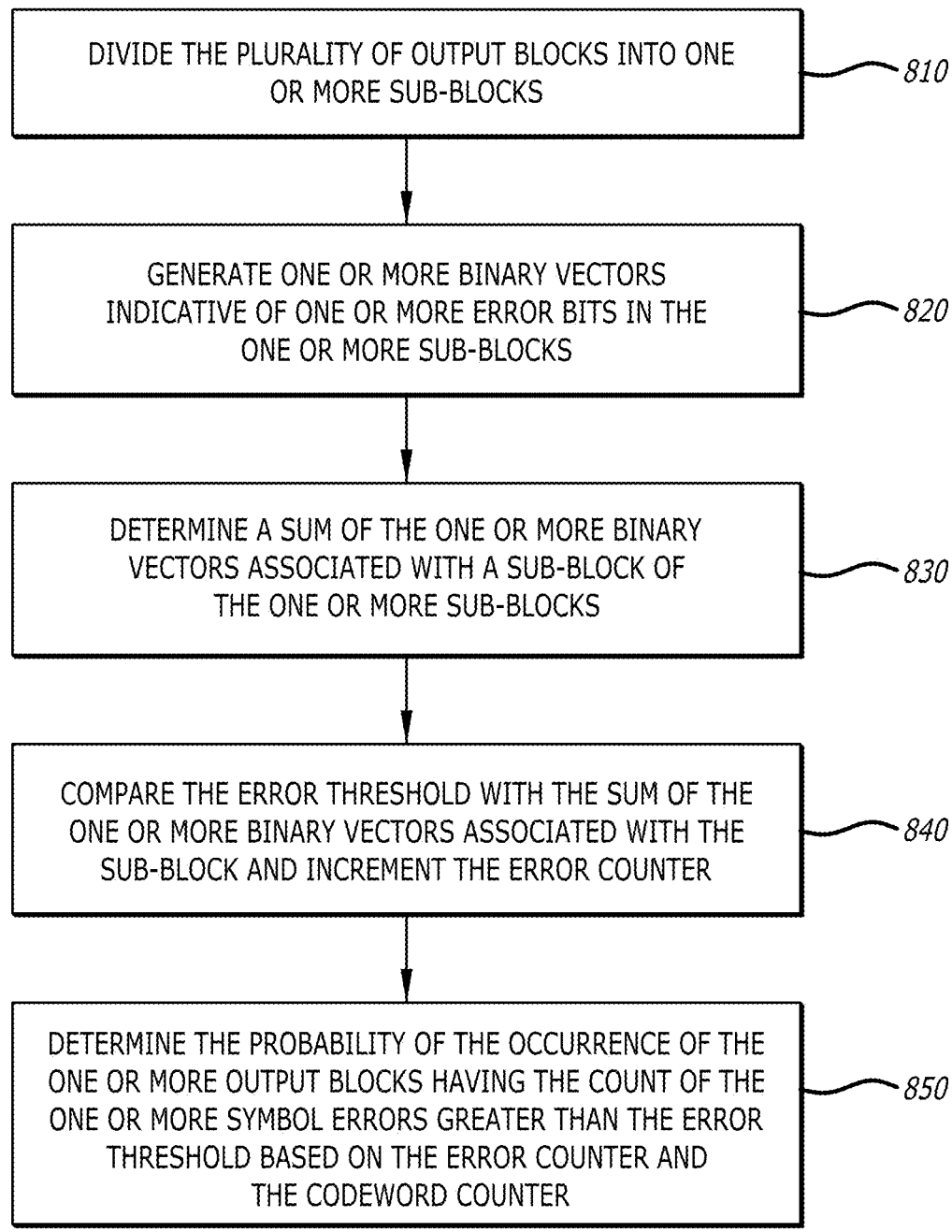
FIG. 8 is a flowchart depicting a process for determining probability of errors, in accordance with various embodiments of the disclosure.

Referring to FIG. 8, a flowchart depicting a process 800 for determining probability of errors, in accordance with various embodiments of the disclosure is shown. In some embodiments, the process 800 can divide the plurality of output blocks into one or more sub-blocks (block 810). In some embodiments, the process 800 may divide each output block into four sub-blocks, for example. In certain embodiments, the process 800 can further divide each sub-block into a number of symbols, where each symbol includes a number of bits.

In a number of embodiments, the process 800 may generate one or more binary vectors indicative of one or more error bits in the one or more sub-blocks (block 820). In some embodiments, the process 800 can check every bit in the symbol to check if the bit is erroneous. In certain embodiments, the process 800 may generate the binary vector such that a bit in the binary vector is marked 1 when a bit in the symbol is erroneous and the bit in the binary vector is marked 0 when the bit in the symbol is not erroneous.

In various embodiments, the process 800 can determine a sum of the one or more binary vectors associated with a sub-block of the one or more sub-blocks (block 830). In some embodiments, the sum of the binary vectors is indicative of the count of errors in the output blocks. In certain embodiments, the process 800 may determine correctable or uncorrectable output blocks.

In additional embodiments, the process 800 may compare the error threshold with the sum of the one or more binary vectors associated with the sub-block and increment the error counter (block 840). In some embodiments, different error thresholds may be defined for different use-cases. In certain embodiments, the output block is uncorrectable if the sum of the binary vectors is greater than the error threshold.

In more embodiments, the process 800 can increment the error counter when the sum of the one or more binary vectors associated with the sub-block exceeds the error threshold.

In further embodiments, the process 800 can determine the probability of the occurrence of the one or more output blocks having the count of the one or more symbol errors greater than the error threshold based on the error counter and the codeword counter (block 850). In some embodiments, the process 800 may determine the probability of k-bad events. In some embodiments, the process 800 may determine the performance metric based on the probability of k-bad events.

Although a specific embodiment for the process 800 for or determining probability of errors for carrying out the various steps, processes, methods, and operations described herein is discussed with respect to FIG. 8, any of a variety of systems and/or processes may be utilized in accordance with embodiments of the disclosure. For example, the process 800 can predict the FLR for the network device based on the performance metric. The elements depicted in FIG. 8 may also be interchangeable with other elements of FIGS. 1-7 and FIGS. 9-12 as required to realize a particularly desired embodiment.

Figure 9:
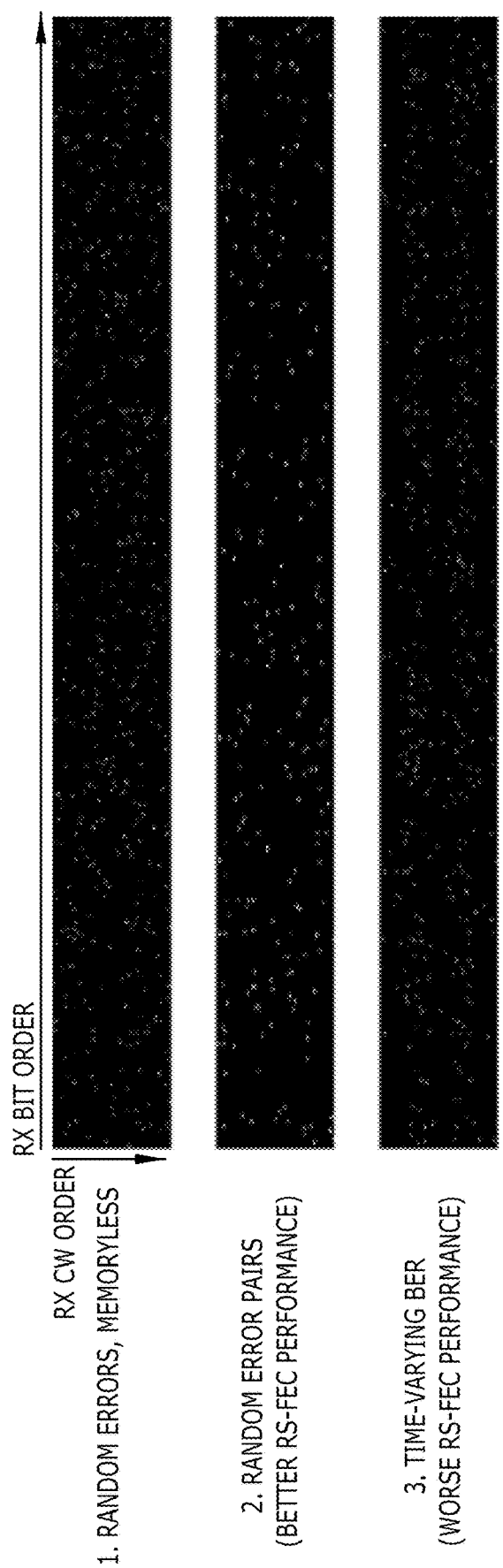
FIG. 9 is a conceptual illustration of different bit error patterns, in accordance with various embodiments of the disclosure.

Referring to FIG. 9, a conceptual illustration of different bit error patterns, in accordance with various embodiments of the disclosure is shown. In many embodiments, in general, different bit error patterns are shown, including for example random errors, memoryless; random error pairs (better RS-FEC performance); and time-varying BER (worse RS-FEC performance). Each pixel may represent a bit, and each row can be approximately 10% of an RS-FEC codeword. Each white pixel may represent a bit error. All three patterns may have the same average BER, but the RS-FEC performance can be different.

In a number of embodiments, in general, the important performance metric for Ethernet is FLR. A Media Access Control (MAC) frame (aka, a packet) which fails CRC check is discarded, and 1 or 100 errors are the same. In modern PHYs, FEC corrects most errors; frames are discarded only due to uncorrectable codewords. Thus, a frequency of uncorrectable FEC codewords should be minimized. Link quality may be expressed by the MTBE, which should be maximized. However, for measuring the SerDes performance, the prevalent method is BER measurement, with common test patterns such as PRBS31. Several Ethernet specifications are stated in terms of BER rather than FLR or CER. In multi-segment links (such as an optical link with electrical interfaces in the hosts), the standard should limit errors at each segment separately. In certain IEEE 802.3 projects, the approach is generally directed to specifying the BER limit to each segment, such that the total BER enables the required link performance in terms of FLR, assuming uncorrelated errors.

Although a specific embodiment for different bit error patterns for carrying out the various steps, processes, methods, and operations described herein is discussed with respect to FIG. 9, any of a variety of systems and/or processes may be utilized in accordance with embodiments of the disclosure. For example, the performance metrics and the receiver performance metric may be equally effective with correlated errors as well as uncorrelated errors. The elements depicted in FIG. 9 may also be interchangeable with other elements of FIGS. 1-8 and FIGS. 10-12 as required to realize a particularly desired embodiment.

Figure 10:
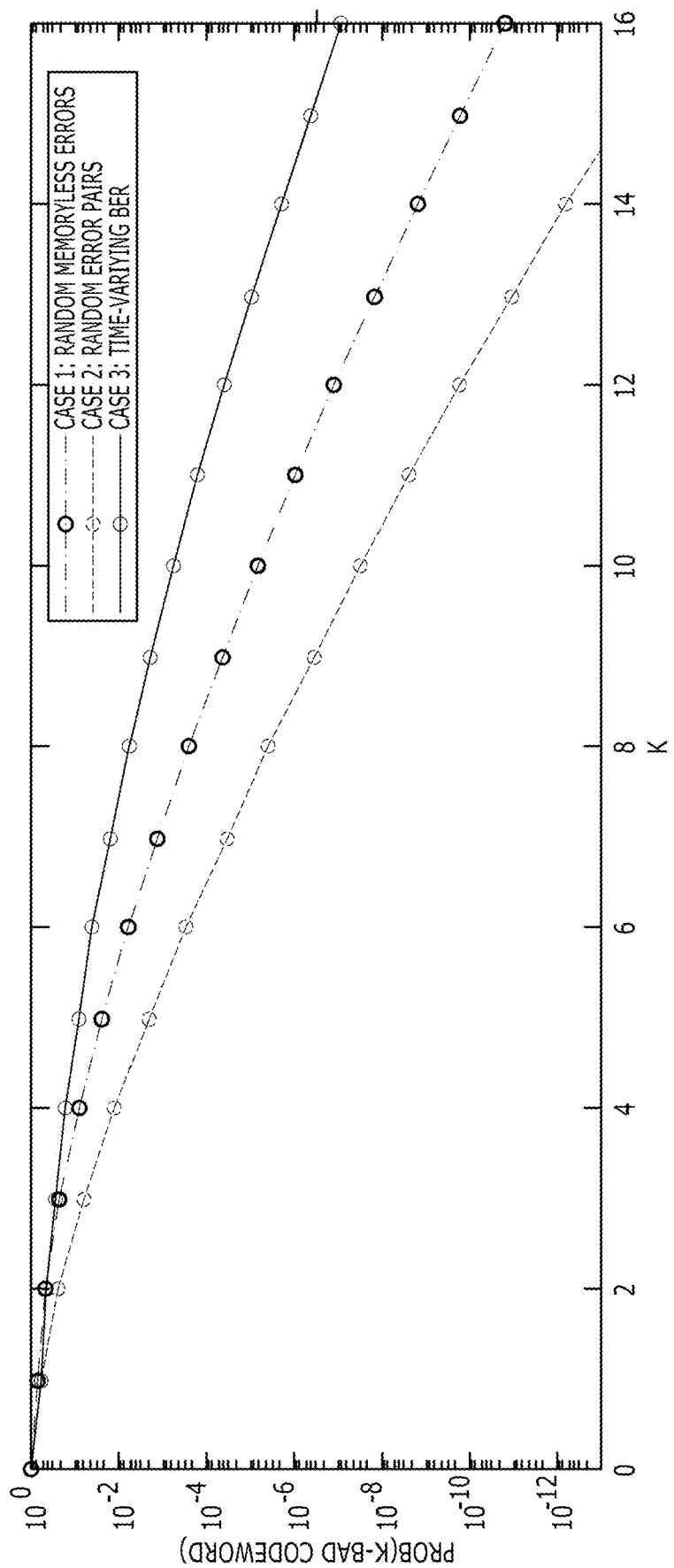
FIG. 10 is a conceptual illustration of demonstrated cases, in accordance with various embodiments of the disclosure.

Referring to FIG. 10, a conceptual illustration of demonstrated cases, in accordance with various embodiments of the disclosure is shown. In many embodiments, Case 1 shows random memoryless errors. Case 2 shows random pair errors. Finally, Case 3 shows time-varying BER. It is desirable to ensure a low enough CER for a multi-segment link. The recent specifications require, for a MAC-to-MAC link, a FLR lower than 6.2e-11 with 64-octet frames with minimum interpacket gap. With 4-way interleaving specified for 800 Gb/s Ethernet, FLR=4.125 CER, which yields CER<6.2e-11/4.12S=1.5e-11. The link may include several electrical interfaces (AUIs) and MII Extenders in addition to the "Ethernet medium". Preferably, the specifications for each segment are based on the errors' effect on the CER, rather than the average BER. Assuming uncorrelated errors, for a given BER, the probability of having k or more symbol errors in the codeword can be calculated. In some embodiments, an Excel function BINOM.DIST may be utilized. The term "k-bad event" is used in this disclosure to denote the codeword with k or more symbol errors.

In a number of embodiments, for example, knowing the period associated with a codeword (e.g., ~7.23 ns in 800G), the following can be calculated: i) the expected number of k-bad events in a given period; and ii) the mean time between such events. With possibly correlated errors, it is desirable to ensure not just a low average BER, but also that the probability of high error count events is low enough. Thus, the specification should be given in terms of the probability of the k-bad event, with suitable k. In a deployed link, the PCS may have RS-FEC codeword error bin registers, enabling "FEC histogram" measurement. For example, see 45.2.1.131a in IEEE Std 802.3ck-2022. The probability of k-bad events can be readily calculated from the histogram (by utilizing the CCDF). The result may be different from the "random errors" model with the same measured BER (for e.g., more frequent k-bad events due to time-varying BER).

In various embodiments, for example, the measured probability of k-bad codewords may be compared to a calculated probability assuming the allocated random BER. Different values of k can be used for per-segment specifications. Assuming errors occur independently on each segment, the k values do not need to sum to 16. In some embodiments, for example, to enable reasonable measurement times, e.g., less than 10 seconds: For each allocated random BER level, the value of k may be determined such that with random errors, k-bad codewords are expected to occur a few times per second. In certain embodiments, for example, if longer measurement times are allowed, for e.g., 10 minutes, the value of k may be increased such that k-bad codewords are expected to occur a few times per minute. In more embodiments, the probability of k-bad events with random errors may also be determined, and the measured probability may be specified as being lower than that.

Although a specific embodiment for demonstrated cases for carrying out the various steps, processes, methods, and operations described herein is discussed with respect to FIG. 10, any of a variety of systems and/or processes may be utilized in accordance with embodiments of the disclosure. For example, different error thresholds (k) can be defined for different use-cases. The elements depicted in FIG. 10 may also be interchangeable with other elements of FIGS. 1-9 and FIGS. 11-12 as required to realize a particularly desired embodiment.

Figure 11A:
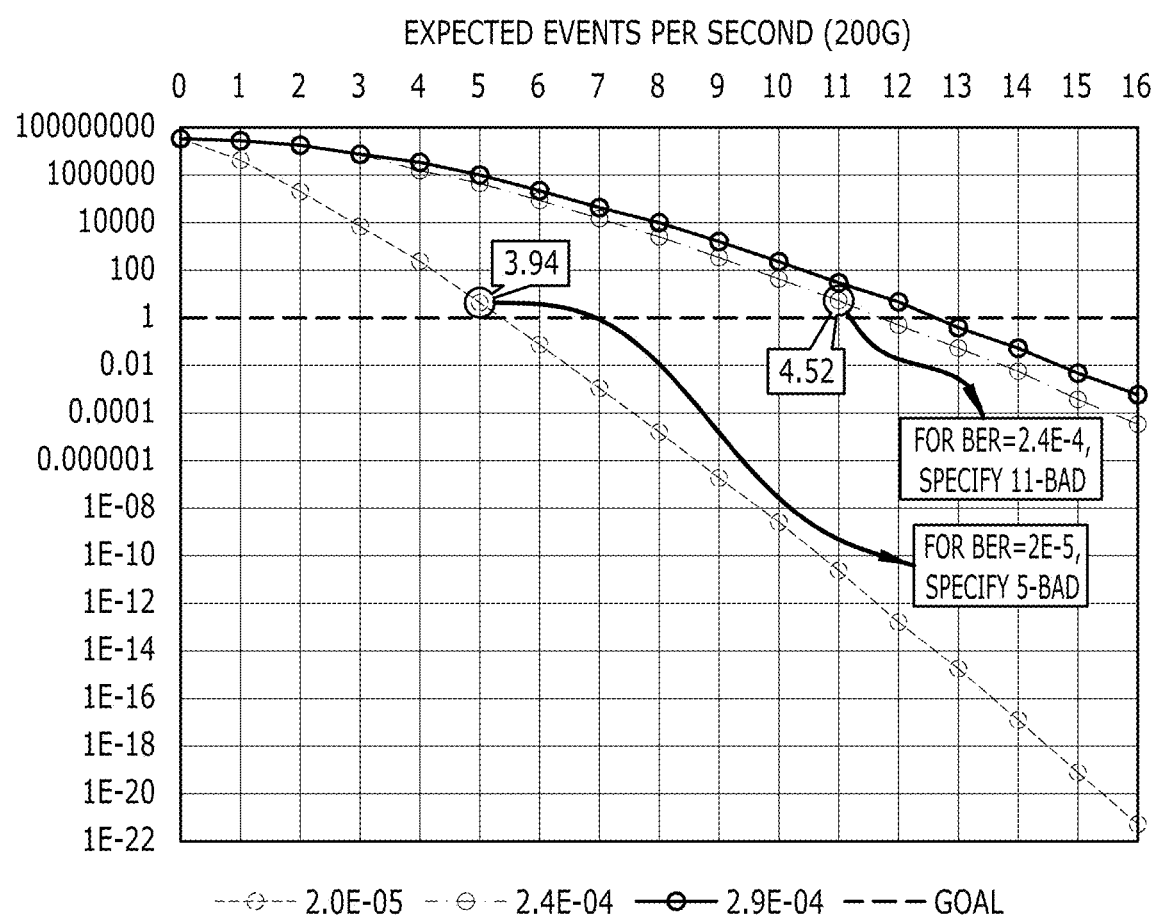
FIG. 11A is a conceptual illustration of values and probabilities for a sample error budget, in accordance with various embodiments of the disclosure.

Referring to FIG. 11A, a conceptual illustration of values and probabilities for a sample error budget, in accordance with various embodiments of the disclosure is shown. In many embodiments, more specifically, assuming single-lane 200G link with uncorrelated errors, expected events per second (200G) are shown, and k-bad probabilities are shown. In general, symbol error histograms are available at the PCS (as part of the RS-FEC decoder). An issue for example is determining how to count symbol errors outside of the PCS—in the SerDes, or at module output, and whether FEC encoded data are to be used and wherein other test patterns may be abandoned (for e.g., PRBS31Q). Symbol error histograms can be calculated with a PRBS too, with respect to 800G and 1.6T at 200G/lane (with symbol muxing and 4-way codeword interleaving). In embodiments, a modification may be implemented when using 200G and 400G (unless 4-way interleaving is adopted there too).

In a number of embodiments, for example, a SerDes-level pattern (PRBS31, or other similar patterns) may be utilized in the PRBS pattern generator and checker configurations, for example. In error checking, the device may process an output block of 4 RS-FEC codewords=21760 bits at a time. Use one counter of codewords, M, and one counter N for codewords with k or more symbol errors (for e.g., k=11). In some embodiments, there may be synchronization with the PRBS test pattern.

In various embodiments, for example, for each sub-block, the sub-block may be divided to 10-bit symbols, wherein each symbol may be marked as "bad" if it has one or more error bits; creating a binary vector Bi, i=0 to 2175. The device can calculate SA, SB, SC, SD—the sums of {B4n}, {B4n+1}, {B4n+2}, {B4n+3}, n=0 to 543. For each of the values {SA, SB, SC, SD}, the device may increment N if the value equals or exceeds k. In some embodiments, M may be incremented by 4. To verify if K-bad event probability (estimated as N/M) meets the specification with sufficient confidence, measurements can be performed for a long enough period.

In additional embodiments, existing bit-level generators and checkers (any pattern) may be utilized and can be used per-lane without requiring a full link, like PRBS31, for example. Such configurations may be low complexity, suitable for implementation in both test equipment and in-product SerDes. Ideally, such configurations may capture time-variance, DFE error propagation, or any other source of correlated errors. Results can be compared to FEC histogram in the PCS. In some embodiments, the configurations may be used for testing compliance. In certain embodiments, even a short measurement time can provide high confidence results.

In further embodiments, for example, a new metric may be generally referred to as a "probability of k-bad events" and denoted p(k), where k is a parameter. A k-bad event can be a codeword with k or more symbol errors. It should be noted that the RS544 code can correct up to 15 symbol errors in a codeword of 544 symbols, where each symbol is 10 bits. Thus, a 16-bad event is a codeword with 16 symbol errors, which is uncorrectable; thus, p(16) is the probability of receiving an uncorrectable codeword, also known as the codeword error ratio (CER).

In many more embodiments, for example, by its definition, p(k) can be a monotonic decreasing function of k. A 0-bad event can be a codeword with 0 or more (any number of) symbol errors; thus p(0)=1. With RS-FEC, the FLR requirement may be mapped to a CER requirement. The mapping can depend on the specific RS_FEC scheme used. For 800G Ethernet, 4-way interleaving of RS544 codewords may be utilized, resulting in the mapping: CER=FLR/4.125. Thus, for an FLR of 6.2e-11, the required CER is at most may be 1.5e-11.

In many additional embodiments, for example, at 800 Gb/s, the CER of some components in the link may be expected to be so small that it would be impractical to measure; but noting that CER=p(16) and that p(k) is a decreasing function, it can be plausible that p(k) may be measured in a reasonable time for some k. Also, when considering different error processes with an average BER but different effect on FEC performance (as expressed by CER=p(16)), these error processes can also be discriminated by p(k) with lower k; in general, if device A and deice B have different error statistics such that device A has higher CER than device B, then for example, p(15) of device A will also be higher than p(15) of device B, and similarly for lower values of k (this typically holds down to at most k=3). Thus, p(k) can be used as a predictor of k(16)=CER, from which the FLR can be predicted; and p(k) is a better predictor than BER.

In many further embodiments, for example, having the p(k) as a metric, the error budget can be allocated to components of the link. For example, by starting with the maximum BER assuming uncorrelated errors. In the case of Ethernet, BER=2.93e-4 with this assumption may result in the limit CER=1.5e-11. The BER may be considered as the uncorrelated-error budget to be divided between components.

In still many embodiments, for example, using the existing allocation of 2.4e-4 for optical link and 2e-5 for each electrical link, assuming uncorrelated errors; p(k) for k=0 to 16 can be calculated in each case: this is the complementary cumulative probability of the binomial distribution, which may be expressed by the below, in some embodiments, for example:

$$p(k) = \sum_{i=k}^{544} SER^i \cdot (1 - SER)^{544-i}$$

$$SER = 1 - (1 - BER)^{10} \approx 10 \cdot BER$$

Figure 11B:
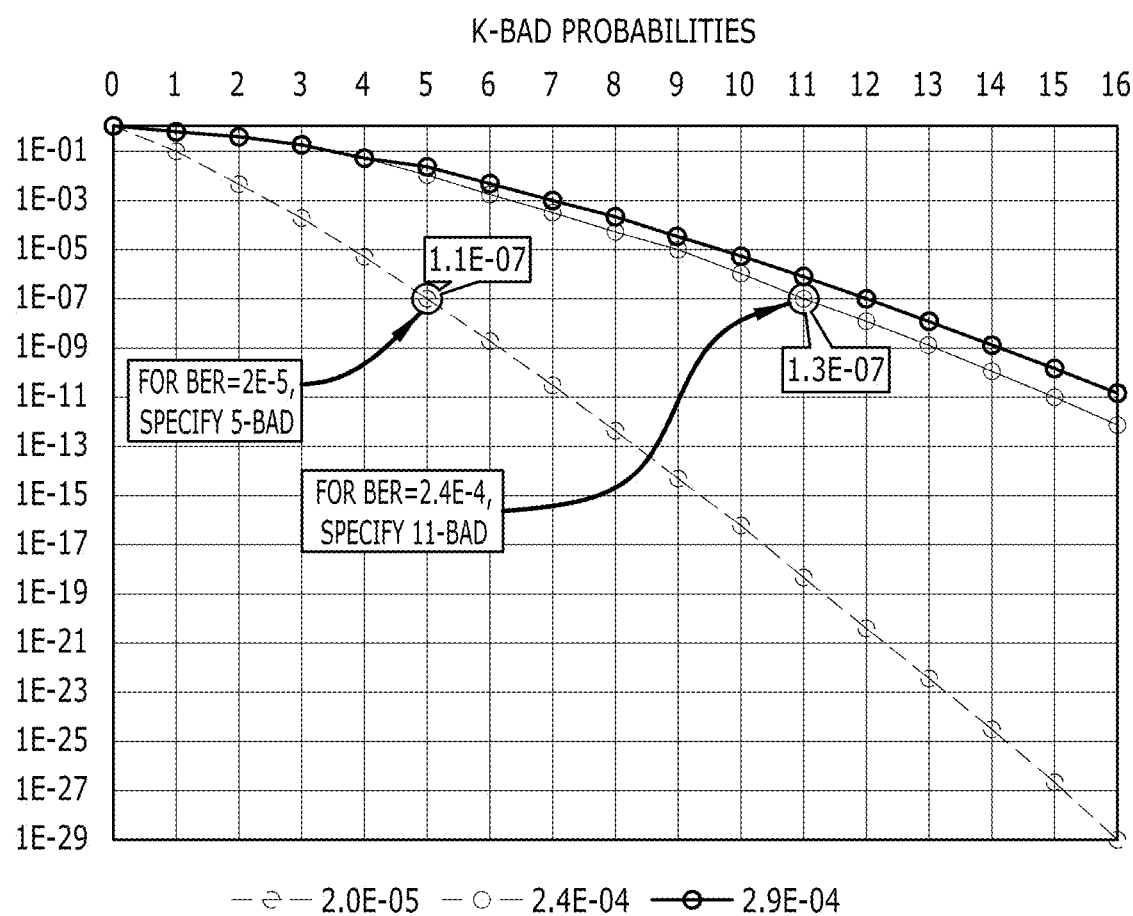
FIG. 11B is a conceptual illustration of values and probabilities for a sample error budget, in accordance with various embodiments of the disclosure.

In still further embodiments, for example, as shown in FIG. 11B, using the data rate and codeword length the mean time between k-bad events, denoted MTBE(k), for each k can be calculated. In order to enable reasonable measurement times for each component, for example, for a test time of ten seconds, values of k such that MTBE(k) will be below one second can be considered. In some more embodiments, for example, if test time is ten minutes or more, the values of k can be higher. In certain embodiments, there may be a tradeoff between test time and the confidence level of the result, i.e., probability of false positive and false negative results. As an example, with BER=2.4e-4, p(11) is 1.31e-7 and MTBE(11) is 55 ms, and with BER=2e-5, p(5) is 1.14e-7 and MTBE(5) is 63 ms. Therefore, the specification of error limits for different components can be expressed as follows. For example, a component allocated a BER of 2.4e-4 may be required to have p(11)<1e-7. A component allocated a BER of 2e-5 may be required to have p(5)<1e-7.

In numerous embodiments, where the limits are slightly lower than the calculated values for uncorrelated errors. Different values of k may be used if the BER allocation is different. Since p(k) can be affected by error statistics that BER is not affected by, limiting p(k) to the values that uncorrelated errors may generate can provide a better confidence that the total CER matches what is expected from the BER budget assuming uncorrelated errors.

In many embodiments, in general, a test can be performed with the SerDes-level pattern (e.g., PRBS31) generated by the pattern generator. The generator, and any stressed signal conditions that are applied in the test, may be the same as in regular received tests. Error checking can be performed in the DUT or in test equipment that receives a looped back signal from the DUT. Accordingly, the modified error checking algorithm described below can be implemented in the DUT or the test equipment. The error checking, process an output block of L RS-FEC codewords, where L is the codeword interleave ratio used in the FEC. For 800G Ethernet, L=4 and the codeword is 5440 bits, so the output block size is 21760 bits. The test equipment may utilize one counter of codewords, M, and one counter N for codewords with k or more symbol errors, where k is a parameter to the test (e.g., k=11).

In a number of embodiments, for example, each sub-block may be divided into 10-bit symbols and each symbol may be marked as "bad" if it has one or more error bits. The result may be a vector E(i) where i proceeds from 0 to the number of symbols minus one; and for 800G, i=0 to 2175. Similarly, E(i) can be 0 when there is no error in any of the bits in symbol i, or 1 if there are any errors. The vector E(i) may be divided into L sub-vectors according to the interleaving, labeled A, B, C . . . such that A(i)=E(L*i), B(i)=E(L*i+1), etc. for 800G, so there can be four sub-vectors, A(i), B(i), C(i), and D(i). The sums of the sub-vectors may be calculated. For example, with respect to 800G, the sub-vectors may be denoted SA, SB, SC, SD. For each of the values {SA, SB, SC, SD}, the counter N may be incremented if the value equals or exceeds k. In some embodiments, M may be incremented by L. The k-bad event probability, p(k), may be estimated as N/M. It should be appreciated that measurements should be conducted for a long enough period to verify that p(k) meets the specification with sufficient confidence.

In various embodiments, the relationship between BER and FLR may be calculated under the assumption of uncorrelated and time-invariant error process and known frame sizes. A common conversion used in Ethernet is that BER=1e-13 is equivalent to FLR=6.2e-11. This FLR is the specified maximum FLR allowed for several Ethernet PHYs. Modern Ethernet PHYs include an additional error correction function such as FEC where data is protected by ECC, encoded by the transmitter, and decoded by the receiver, such that most errors are corrected. This enables operation with relatively high input BER while maintaining low FLR. The relationship between BER and FLR with FEC encoding can also be calculated under the assumption of random and uncorrelated errors and known frame sizes, and the specific FEC being used.

In additional embodiments, for example, Ethernet PHYs at 200 Gb/s and 400 Gb/s utilize the RS code defined in clause 119 of IEEE 802.3-2022. This code (commonly known as RS-FEC or RS544) is capable of correcting up to 15 symbol errors in a codeword of 544 symbols, where each symbol is 10 bits. Assuming random and uncorrelated errors, this code can convert an input BER of up to 2.9e-4 to output FLR below the specified maximum of 6.2e-12.

In further embodiments, when the assumption of uncorrelated and time-invariant error process does not hold, such as when errors appear in bursts or appear more often in specific periods and less often in other periods, the relationship between BER and FLR can change significantly. This is especially true with the presence of FEC, where different error processes with the same BER can make the FEC either fail or operate virtually error-free. Thus, using BER to predict the FLR can result in large difference from the real FLR, often rendering the prediction useless.

In many more embodiments, typical communication systems are composed of multiple segments between a data transmitter and a data receiver, where each segment can create errors. As an example, the transmitter can be an Ethernet controller Application Specific Integrated Circuits (ASICs), which encodes the data with FEC and sends the encoded data as a bit stream over an electrical channel (Printed Circuit Board (PCB) traces) to an optical module. The optical module may recover the bit stream and re-transmit the bit stream as an optical signal sent over an optical channel (fiber plant) to an optical module in an Ethernet switch. The optical module in the switch can recover the bit stream from the optical signal and re-transmit it as an electrical signal sent over an electrical channel (PCB traces) to a retimer device inside the switch. The retimer device can recover the bit stream and re-transmit it as another electrical signal to the switch ASIC, which recovers the bits stream and decodes by utilizing FEC. Thus, errors can be introduced by multiple components: the first optical module, the second optical module, the retimer device, and the switch ASIC.

Although a specific embodiment for values and probabilities for a sample error budget for carrying out the various steps, processes, methods, and operations described herein is discussed with respect to FIGS. 11A and 11B, any of a variety of systems and/or processes may be utilized in accordance with embodiments of the disclosure. For example, different error budgets can be defined for different use-cases. The elements depicted in FIGS. 11A and 11B may also be interchangeable with other elements of FIGS. 1-10 and FIG. 12 as required to realize a particularly desired embodiment.

Figure 12:
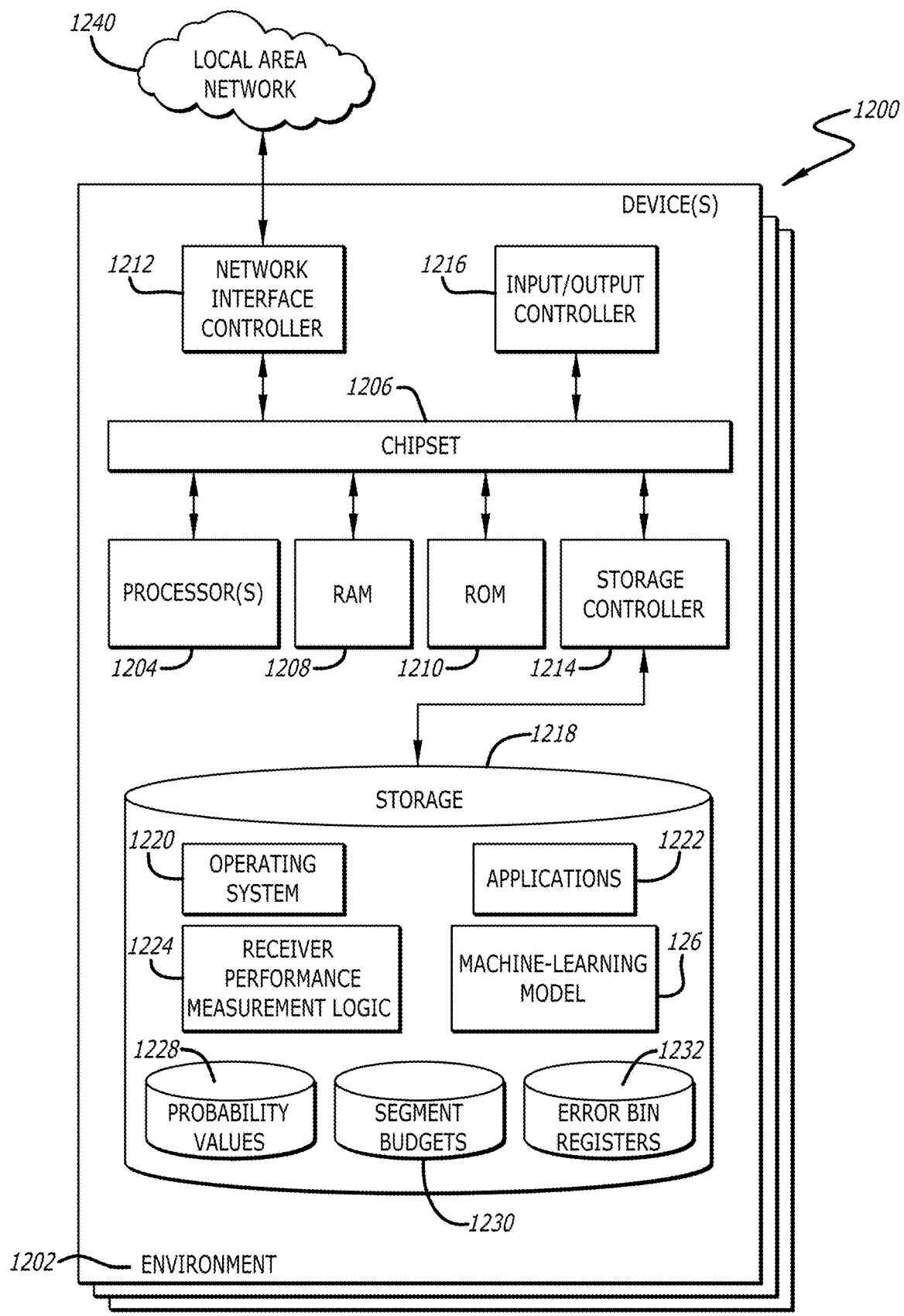
FIG. 12 is a conceptual block diagram of a device suitable for configuration with a receiver performance measurement logic, in accordance with various embodiments of the disclosure.

Referring to FIG. 12, a conceptual block diagram of a device 1200 suitable for configuration with a receiver performance measurement logic, in accordance with various embodiments of the disclosure is shown. The embodiment of the conceptual block diagram depicted in FIG. 12 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 12 can also illustrate an access point, a switch, or a router in accordance with various embodiments of the disclosure. The device 1200 may, in many non-limiting examples, correspond to physical devices or to virtual resources described herein.

In many embodiments, the device 1200 may include an environment 1202 such as a baseboard or "motherboard," in physical embodiments that can be configured as a printed circuit board with a multitude of components or devices connected by way of a system bus or other electrical communication paths. Conceptually, in virtualized embodiments, the environment 1202 may be a virtual environment that encompasses and executes the remaining components and resources of the device 1200. In more embodiments, one or more processors 1204, such as, but not limited to, central processing units ("CPUs") can be configured to operate in conjunction with a chipset 1206. The processor(s) 1204 can be standard programmable CPUs that perform arithmetic and logical operations necessary for the operation of the device 1200.

In a number of embodiments, the processor(s) 1204 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1206 may provide an interface between the processor(s) 1204 and the remainder of the components and devices within the environment 1202. The chipset 1206 can provide an interface to a random-access memory ("RAM") 1208, which can be used as the main memory in the device 1200 in some embodiments. The chipset 1206 can further be configured to provide an interface to a computer-readable storage medium such as a read-only memory ("ROM") 1210 or non-volatile RAM ("NVRAM") for storing basic routines that can help with various tasks such as, but not limited to, starting up the device 1200 and/or transferring information between the various components and devices. The ROM 1210 or NVRAM can also store other application components necessary for the operation of the device 1200 in accordance with various embodiments described herein.

Additional embodiments of the device 1200 can be configured to operate in a networked environment using logical connections to remote computing devices and computer systems through a network, such as the network 1240. The chipset 1206 can include functionality for providing network connectivity through a network interface card ("NIC") 1212, which may comprise a gigabit Ethernet adapter or similar component. The NIC 1212 can be capable of connecting the device 1200 to other devices over the network 1240. It is contemplated that multiple NICs 1212 may be present in the device 1200, connecting the device to other types of networks and remote systems.

In further embodiments, the device 1200 can be connected to a storage 1218 that provides non-volatile storage for data accessible by the device 1200. The storage 1218 can, for instance, store an operating system 1220, applications 1222, probability values 1228, segment budgets 1230, and error bin registers 1232 which are described in greater detail below. The storage 1218 can be connected to the environment 1202 through a storage controller 1214 connected to the chipset 1206. In certain embodiments, the storage 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The probability values 1228 can store the probability values for k-bad events. The segment budgets 1230 may store the error budgets specified for the segments that comply with the standard or the specification. The error bin registers 1232 may store the output blocks or the FEC codewords.

The device 1200 can store data within the storage 1218 by transforming the physical state of the physical storage units to reflect the information being stored. The specific transformation of physical state can depend on various factors. Examples of such factors can include, but are not limited to, the technology used to implement the physical storage units, whether the storage 1218 is characterized as primary or secondary storage, and the like.

In many more embodiments, the device 1200 can store information within the storage 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1200 can further read or access information from the storage 1218 by detecting the physical states or characteristics of one or more particular locations within the physical storage units.

In addition to the storage 1218 described above, the device 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1200. In some examples, the operations performed by a cloud computing network, and or any components included therein, may be supported by one or more devices similar to device 1200. Stated otherwise, some or all of the operations performed by the cloud computing network, and or any components included therein, may be performed by one or more devices 1200 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1218 can store an operating system 1220 utilized to control the operation of the device 1200. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1218 can store other system or application programs and data utilized by the device 1200.

In many additional embodiments, the storage 1218 or other computer-readable storage media is encoded with computer-executable instructions which, when loaded into the device 1200, may transform it from a general-purpose computing system into a special-purpose computer capable of implementing the embodiments described herein. These computer-executable instructions may be stored as application 1222 and transform the device 1200 by specifying how the processor(s) 1204 can transition between states, as described above. In some embodiments, the device 1200 has access to computer-readable storage media storing computer-executable instructions which, when executed by the device 1200, perform the various processes described above with regard to FIGS. 1-11. In certain embodiments, the device 1200 can also include computer-readable storage media having instructions stored thereupon for performing any of the other computer-implemented operations described herein.

In many further embodiments, the device 1200 may include a receiver performance measurement logic 1224. The receiver performance measurement logic 1224 can be configured to perform one or more of the various steps, processes, operations, and/or other methods that are described above. Often, the receiver performance measurement logic 1224 can be a set of instructions stored within a non-volatile memory that, when executed by the processor(s)/controller(s) 1204 can carry out these steps, etc. In some embodiments, the receiver performance measurement logic 1224 may be a client application that resides on a network-connected device, such as, but not limited to, a server, switch, personal or mobile computing device in a single or distributed arrangement. The receiver performance measurement logic 1224 can determine the performance metric for the segments coupled to the device 1200 and the receiver performance metric for the device 1200.

In still further embodiments, the device 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can be configured to provide output to a display, such as a computer monitor, a flat panel display, a digital projector, a printer, or other type of output device. Those skilled in the art will recognize that the device 1200 might not include all of the components shown in FIG. 12 and can include other components that are not explicitly shown in FIG. 12 or might utilize an architecture completely different than that shown in FIG. 12.

As described above, the device 1200 may support a virtualization layer, such as one or more virtual resources executing on the device 1200. In some examples, the virtualization layer may be supported by a hypervisor that provides one or more virtual machines running on the device 1200 to perform functions described herein. The virtualization layer may generally support a virtual resource that performs at least a portion of the techniques described herein.

Finally, in numerous additional embodiments, data may be processed into a format usable by a machine-learning model 1226 (e.g., feature vectors), and or other pre-processing techniques. The machine-learning ("ML") model 1226 may be any type of ML model, such as supervised models, reinforcement models, and/or unsupervised models. The ML model 1226 may include one or more of linear regression models, logistic regression models, decision trees, Naïve Bayes models, neural networks, k-means cluster models, random forest models, and/or other types of ML models 1226.

The ML model(s) 1226 can be configured to generate inferences to make predictions or draw conclusions from data. An inference can be considered the output of a process of applying a model to new data. This can occur by learning from at least the probability values 1228, the segment budgets 1230, and the error bin registers 1232 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1226 may be generated by human/administrator verifications or may compare predicted outcomes with actual outcomes.

Although a specific embodiment for a device suitable for configuration with a receiver performance measurement logic for carrying out the various steps, processes, methods, and operations described herein is discussed with respect to FIG. 12, any of a variety of systems and/or processes may be utilized in accordance with embodiments of the disclosure. For example, the device 1200 may be in a virtual environment such as a cloud-based network administration suite, or it may be distributed across a variety of network devices or switches. The elements depicted in FIG. 12 may also be interchangeable with other elements of FIGS. 1-11 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor; and
a receiver performance measurement logic, configured to:
store a plurality of error patterns associated with one or more network devices wherein each error pattern comprises a plurality of symbol errors;
retrieve one or more symbol errors from the plurality of error patterns;
access one or more segments associated with at least one of the one or more network devices;
determine an error threshold for at least one segment; and
generate a performance metric based on the one or more symbol errors and the error threshold.

2. The device of claim 1, wherein the plurality of error patterns are stored in a plurality of error bin registers.

3. The device of claim 2, wherein the plurality of error bin registers are located within the network device.

4. The device of claim 1, wherein the error threshold is based on a predefined bit error rate (BER) level.

5. The device of claim 1, wherein the plurality of error patterns include a count of the one or more symbol errors within one or more Forward Error Correction (FEC) codewords.

6. The device of claim 5, wherein the receiver performance measurement logic is further configured to:
determine a count of the one or more FEC codewords having a count of the one or more symbol errors equal to the error threshold;
determine a probability of occurrence of the one or more FEC codewords having the count of the one or more symbol errors not less than the error threshold based on the plurality of error patterns and the count of the one or more FEC codewords having the count of the one or more symbol errors equal to the error threshold; and
generate the performance metric based on the probability of the occurrence of the one or more FEC codewords having the count of the one or more symbol errors not less than the error threshold.

7. The device of claim 6, wherein the receiver performance measurement logic is further configured to:
determine a Code Error Ratio (CER) based on the performance metric; and
predict a Frame Loss ratio (FLR) associated with the network device based on the CER.

8. The device of claim 6, wherein the receiver performance measurement logic is further configured to determine a segment error budget for each segment of the one or more segments associated with the network device based on the performance metric.

9. The device of claim 6, wherein the receiver performance measurement logic is further configured to determine a mean time between the occurrence of one or more FEC codewords having the count of the one or more symbol errors equal to the error threshold.

10. The device of claim 5, wherein the receiver performance measurement logic is further configured to:
generate one or more performance metrics associated with the one or more segments coupled to the network device; and
generate a receiver performance metric associated with the network device based on the one or more performance metrics associated with the one or more segments.

11. The device of claim 10, wherein the network device operates in a Physical Coding Sublayer (PCS).

12. The device of claim 1, wherein the receiver performance measurement logic is further configured to:

generate a predefined test pattern;
apply the predefined test pattern to the network device; and
receive a plurality of output blocks from the network device in response to the predefined test pattern.

13. The device of claim 12, wherein the receiver performance measurement logic is further configured to:
determine a count of the one or more symbol errors in an output block of the plurality of output blocks;
increment a codeword counter;
compare the count of the one or more symbol errors in the output block with the error threshold; and
increment an error counter if the count of the one or more symbol errors in the output block is greater than the error threshold.

14. The device of claim 13, wherein the receiver performance measurement logic is further configured to:
determine a probability of occurrence of one or more output blocks having the count of the one or more symbol errors greater than the error threshold; and
generate the performance metric based on the probability of the occurrence of the one or more output blocks having the count of the one or more symbol errors greater than the error threshold.

15. The device of claim 14, wherein the receiver performance measurement logic is further configured to:
divide the plurality of output blocks into one or more sub-blocks;
generate one or more binary vectors indicative of one or more error bits in the one or more sub-blocks;
determine a sum of the one or more binary vectors associated with a sub-block of the one or more sub-blocks;
compare the error threshold with the sum of the one or more binary vectors associated with the sub-block;
increment the error counter if the sum of the one or more binary vectors associated with the sub-block is greater than the error threshold; and
determine the probability of the occurrence of the one or more output blocks having the count of the one or more symbol errors greater than the error threshold based on the error counter and the codeword counter.

16. The device of claim 15, wherein the network device is a Serializer/De-serializer (SerDes).

17. A device, comprising:
a processor;
a memory communicatively coupled to the processor; and
a receiver performance measurement logic, configured to:
store a plurality of error patterns associated with one or more network devices wherein each error pattern comprises a plurality of symbol errors corresponding to one or more Forward Error Correction (FEC) codewords;
retrieve one or more symbol errors from the plurality of error patterns;
access one or more segments associated with at least one of the one or more network devices;
determine an error threshold for at least one segment;
determine a probability of occurrence of the one or more FEC codewords having a count of the one or more symbol errors not less than the error threshold based on the plurality of error patterns and the error threshold; and
generate a performance metric based on the probability of the occurrence of the one or more FEC codewords having the count of the one or more symbol errors not less than the error threshold.

18. The device of claim 17, wherein the receiver performance measurement logic is further configured to determine a segment error budget for each segment of the one or more segments associated with the network device based on the performance metric.

19. A method, comprising:
storing a plurality of error patterns associated with one or more network devices wherein each error pattern comprises a plurality of symbol errors corresponding to one or more Forward Error Correction (FEC) codewords;
retrieving one or more symbol errors from the plurality of error patterns;
accessing one or more segments associated with at least one of the one or more network devices;
determining an error threshold for at least one segment; and
generating a performance metric based on the one or more symbol errors and the error threshold.

20. The method of claim 19, further comprising:
determining a count of the one or more FEC codewords having a count of the one or more symbol errors equal to the error threshold;
determining a probability of occurrence of the one or more FEC codewords having the count of the one or more symbol errors not less than the error threshold based on the plurality of error patterns and the count of FEC codewords having the count of the one or more symbol errors not less than the error threshold; and
generating the performance metric based on the probability of the occurrence of the one or more FEC codewords having the count of the one or more symbol errors not less than the error threshold.

* * * * *